(12) United States Patent
Iijima et al.

(10) Patent No.: US 8,390,703 B2
(45) Date of Patent: Mar. 5, 2013

(54) IMAGE PICKUP APPARATUS AND SEMICONDUCTOR CIRCUIT ELEMENT

(75) Inventors: Tomokuni Iijima, Kanagawa (JP); Satoshi Tamaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 407 days.

(21) Appl. No.: 12/678,881

(22) PCT Filed: Jul. 23, 2009

(86) PCT No.: PCT/JP2009/003464
§ 371 (c)(1),
(2), (4) Date: Mar. 18, 2010

(87) PCT Pub. No.: WO2010/010707
PCT Pub. Date: Jan. 28, 2010

(65) Prior Publication Data
US 2010/0259648 A1 Oct. 14, 2010

(30) Foreign Application Priority Data
Jul. 23, 2008 (JP) .................................. 2008-189562

(51) Int. Cl.
*H04N 5/262* (2006.01)
(52) U.S. Cl. ........ 348/240.99; 348/42; 348/47; 348/374
(58) Field of Classification Search ............ 348/42, 348/47, 240.99, 374
See application file for complete search history.

(56) References Cited

U.S. PATENT DOCUMENTS

| | | | |
|---|---|---|---|
| 6,184,511 B1 * | 2/2001 | Yamashita | 250/201.2 |
| 6,337,736 B1 | 1/2002 | Sugiyama et al. | |
| 2002/0122124 A1 | 9/2002 | Suda | |
| 2003/0086013 A1 | 5/2003 | Aratani | |
| 2004/0021773 A1 | 2/2004 | Hayakawa | |
| 2005/0018265 A1 * | 1/2005 | Atsuumi et al. | 359/196 |
| 2006/0077543 A1 * | 4/2006 | Miyoshi et al. | 359/407 |
| 2006/0082879 A1 | 4/2006 | Miyoshi et al. | |
| 2007/0097249 A1 | 5/2007 | Korenaga | |
| 2007/0247611 A1 | 10/2007 | Tamaki et al. | |
| 2009/0010633 A1 | 1/2009 | Strandemar et al. | |
| 2009/0160997 A1 | 6/2009 | Oyama et al. | |

FOREIGN PATENT DOCUMENTS

| | | |
|---|---|---|
| JP | 04-350613 | 12/1992 |
| JP | 07-087385 | 3/1995 |
| JP | 10281761 A | 10/1998 |
| JP | 11-305112 | 11/1999 |
| JP | 2001099643 A | 4/2001 |
| JP | 2002-204462 | 7/2002 |

(Continued)

*Primary Examiner* — Anthony J Daniels
(74) *Attorney, Agent, or Firm* — McDermott Will & Emery LLP

(57) ABSTRACT

An image pickup apparatus of the present invention includes: a lens array having a plurality of lenses; a plurality of image pickup regions (123) disposed to correspond to the plurality of lenses one-to-one and each including a light receiving surface substantially perpendicular to a direction in which an optical axis of the corresponding lens extends; a temperature sensor (126) disposed in the vicinity of the lens array to detect a temperature; a correction coefficient generating portion (142) configured to generate, based on the temperature, correction coefficients including correction coefficients correlated to magnifications of images taken in the image pickup regions; and a correction calculating portion (143, 144) configured to correct, based on the correction coefficients, image pickup signals generated in the image pickup regions and calculate a parallax using the corrected image pickup signals.

4 Claims, 20 Drawing Sheets

FOREIGN PATENT DOCUMENTS

| | | |
|---|---|---|
| JP | 2003-143459 | 5/2003 |
| JP | 2007-033315 | 2/2007 |
| JP | 2007-081806 | 3/2007 |
| JP | 2007271301 A | 10/2007 |
| JP | 2007-322128 | 12/2007 |
| JP | 4264464 | 5/2009 |
| WO | WO 2004/106848 A1 | 12/2004 |
| WO | WO 2004/106858 A1 | 12/2004 |
| WO | WO-2005119175 A1 | 12/2005 |
| WO | WO 2009/001563 A1 | 12/2008 |

* cited by examiner

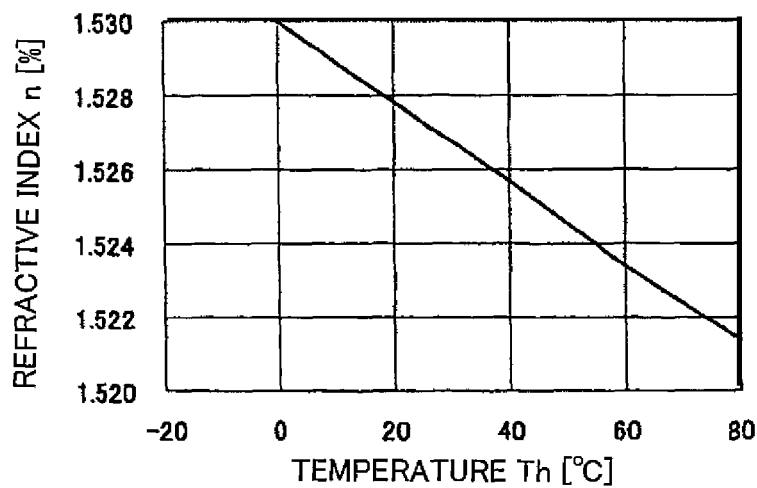
Fig. 1 1 (a)
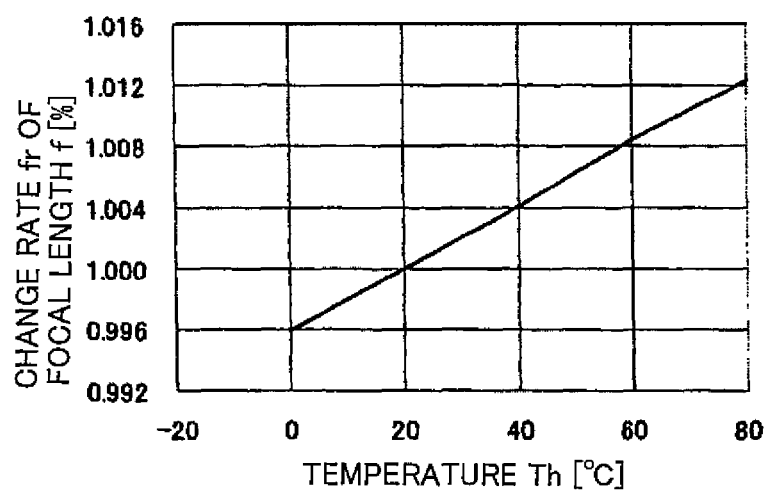
Fig. 1 1 (b)

| Ts | xc1 |
|---|---|
| 0 | xc1_0 |
| 256 | xc1_256 |
| 512 | xc1_512 |
| 768 | xc1_768 |
| 1024 | xc1_1024 |
| ... | ... |
| 3840 | xc1_3840 |
| 4096 | xc1_4096 |

Fig. 15

IMAGE PICKUP APPARATUS AND SEMICONDUCTOR CIRCUIT ELEMENT

TECHNICAL FIELD

The present invention relates to an image pickup apparatus capable of measuring distances and a semiconductor circuit element used in the image pickup apparatus.

BACKGROUND ART

One example of a conventional image pickup apparatus capable of measuring distances is an image pickup apparatus of PTL 1. FIG. 24 is an exploded perspective view of the image pickup apparatus of PTL 1. FIG. 25 is a diagram for explaining an image pickup block of the image pickup apparatus of PTL 1. As shown in FIGS. 24 and 25, an image pickup apparatus 901 that is a compound-eye image pickup system includes an iris member 902, an optical lens array 903, a light shielding block 904, an optical filter 906, and an image pickup unit 907. In the image pickup apparatus 901, the iris member 902 having four openings 902-1, 902-2, 902-3, and 902-4 and the optical lens array 903 having four optical blocks (lenses) 903-1, 903-2, 903-3, and 903-4 constitute four image pickup optical systems. Light beams having passed through the respective image pickup optical systems form images on four image pickup blocks 907-1, 907-2, 907-3, and 907-4, respectively, on the image pickup unit 907. The image pickup unit 907 constituted by, for example, a CCD sensor is formed on a semiconductor substrate 910 together with a drive circuit 908 configured to drive the image pickup unit 907 and a parallax calculating circuit 909 configured to calculate information regarding parallax among images taken by the plurality of image pickup blocks 907-1 to 907-4.

As described above, the light beams having passed through the openings 902-1 to 902-4 of the iris member 902 are refracted by the lenses 903-1 to 903-4, respectively. Then, the light beams pass through the light shielding block 904 and the optical filter 906 to form images on the image pickup blocks 907-1 to 907-4. Then, for example, a degree of similarity between the image taken by the image pickup block 907-1 and the image taken by the image pickup block 907-2 is calculated using block matching. A parallax d is calculated based on the degree of similarity, and a distance L is calculated based on the parallax d as shown by Formula (1) below. In Formula (1), f is a focal length of each of the lenses 903-1 and 903-2, B is an interval between optical axes of the lenses 903-1 and 903-2, and p is a pixel pitch of the image pickup unit 907 in a direction in which the optical axes of the lens 903-1 and 903-2 are opposite to each other.

$$L=(f*B)/(p*d) \quad (1)$$

However, the lens array 903 deforms with changes in temperature, and this changes the interval B between the optical axes of the lenses. Therefore, if the temperature changes, the distance cannot be calculated properly.

An image pickup apparatus capable of dealing with such temperature change is disclosed in PTL 2. Since the image pickup apparatus of PTL 2 is the same in configuration as the image pickup apparatus of PTL 1 except that the image pickup apparatus of PTL 2 includes a temperature sensor, it will be explained in reference to FIG. 24. The image pickup apparatus of PTL 2 includes the lenses 903-1 to 903-4 arranged at regular intervals and a temperature sensor configured to measure a temperature T of a portion in the vicinity of the lenses 903-1 to 903-4. The image pickup apparatus of PTL 2 uses the temperature T to correct images I1 to I4 taken by the image pickup blocks 907-1 to 907-4.

More specifically, the image pickup apparatus of PTL 2 calculates an amount (T−T0) of change in temperature with respect to a reference temperature T0, and as shown by Formula (2) below, calculates an amount z of change in the interval B between the optical axes of the lenses due to the temperature change based on a difference (aL−aS) between a linear thermal expansion coefficient aL of the lens array and a linear expansion coefficient aS of the image pickup unit 907. Then, using the image I1 taken by the image pickup block 907-1 as a reference as shown by Formula (3) below, the images I2, I3, and I4 taken by the image pickup blocks 907-2, 907-3, and 907-4, respectively, are corrected by the change in the interval between the optical axes of the lenses as shown by Formulas (4), (5), and (6) below. Here, the lenses 903-1 and 903-2 are arranged away from each other in an x-axis direction, the lenses 903-3 and 903-4 are arranged away from each other in the x-axis direction, the lenses 903-1 and 903-3 are arranged away from each other in a y-axis direction, and the lenses 903-2 and 903-4 are arranged away from each other in the y-axis direction. Then, p is the pixel pitch of the image pickup unit 907, and is the same in the x-axis direction and the y-axis direction. Each of I1(x, y), I2(x, y), I3(x, y), and I4(x, y) denotes luminance of each image at coordinates (x, y). As compared to the lens 903-1, the lens 903-2 moves by z/p pixels in the x-axis direction due to the temperature change. Therefore, as shown by Formula (4), I2(x, y) is corrected so as to move by z/p in the x-axis direction. Moreover, as compared to the lens 903-1, the lens 903-3 moves by z/p pixels in the y-axis direction due to the temperature change. Therefore, as shown by Formula (5), I3(x, y) is corrected so as to move by z/p in the y-axis direction. Further, as compared to the lens 903-1, the lens 903-4 moves by z/p pixels in the x-axis direction and by z/p pixels in the y-axis direction due to the temperature change. Therefore, as shown by Formula (6), I4(x, y) is corrected so as to move by z/p pixels in the x-axis direction and by z/p pixels in the y-axis direction.

$$z=B(aL-aS)(T-T0) \quad (2)$$

$$I1(x, y)=I1(x, y) \quad (3)$$

$$I2(x, y)=I2(x+z/p, y) \quad (4)$$

$$I3(x, y)=I3(y, x+z/p) \quad (5)$$

$$I4(x, y)=I4(x+z/p, y+z/p) \quad (6)$$

CITATION LIST

Patent Literature

PTL 1: Japanese Laid-Open Patent Application Publication No. 2003-143459

PTL 2: Japanese Laid-Open Patent Application Publication No. 2002-204462

SUMMARY OF INVENTION

Technical Problem

As described above, the conventional image pickup apparatus described in PTL 2 uses the image I1 taken by the image pickup block 907-1 as a reference to correct the images I2, I3, and I4 taken by the image pickup blocks 907-2, 907-3, and 907-4 by the change in the interval between the optical axes of the lenses as shown by Formulas (4), (5), and (6).

However, in the conventional image pickup apparatus described in PTL 2, the optical axis is corrected, but the change in the magnification of the taken image is not considered. To be specific, due to the temperature change of the lens array, a refractive index changes, and a focal length f of the lens changes. In addition, due to the temperature change of a barrel, a distance from the lens array to an image pickup region changes. In these cases, the magnification of the taken image changes. Therefore, since the parallax and a subject distance to be calculated change by the change in the magnification, the accuracy of the distance calculation deteriorates.

The present invention was made to solve the above problems, and an object of the present invention is to provide an image pickup apparatus capable of measuring distances with high accuracy even if a temperature changes and a magnification of a taken image changes, and a semiconductor circuit element used in the image pickup apparatus.

Solution to Problem

In order to solve the above problems, an image pickup apparatus of the present invention includes: a lens array including a plurality of lenses; a plurality of image pickup regions disposed to correspond to the plurality of lenses one-to-one and each including a light receiving surface substantially perpendicular to a direction in which an optical axis of the corresponding lens extends; a temperature sensor disposed in a vicinity of the lens array to detect a temperature; a correction coefficient generating portion configured to generate, based on the temperature detected by the temperature sensor, correction coefficients including correction coefficients (hereinafter referred to as "magnification correlation correction coefficients") correlated to magnifications of images taken in the image pickup regions; and a correction calculating portion configured to correct, based on the correction coefficients, image pickup signals generated in the image pickup regions and calculate a parallax using the corrected image pickup signals. Here, the above "correction coefficients correlated to magnifications of images taken in the image pickup regions" denote correction coefficients each for correcting a physical quantity correlated to the magnification of the image taken in the image pickup region. Typically, such correction coefficients are the magnifications of the images taken in the image pickup regions and the focal lengths of the plurality of lenses. In addition, such correction coefficients are the extension or shrinkage of the barrel configured to store the lens array, refractive indexes of the plurality of lenses, and the like, which are correlated to the above magnification or the focal length.

In accordance with this configuration, based on the correction coefficient which is generated based on the temperature detected by the temperature sensor and correlated to the magnification of the image taken in the image pickup region, the image pickup signal generated in the image pickup region is corrected, and/or the parallax is calculated using the corrected image pickup signal. Therefore, even if the temperature changes, and the magnification of the taken image changes, the change in the magnification due to the temperature change can be compensated. As a result, the distance measurement can be carried out with high accuracy.

The correction coefficient generating portion may be configured to generate, based on the temperature detected by the temperature sensor, as the magnification correlation correction coefficient, a magnification for correcting extension or shrinkage of a barrel configured to store the lens array and the plurality of image pickup regions, and the correction calculating portion may be configured to correct, based on the magnification, the image pickup signal generated in the image pickup region.

In accordance with this configuration, even if the temperature changes, and the barrel extends, the change in the magnification of the image taken in the image pickup region which change is caused by the extension or shrinkage of the barrel can be compensated.

The correction coefficient generating portion may be configured to generate, based on the temperature detected by the temperature sensor, as the magnification correlation correction coefficient, a magnification for correcting a change in a refractive index of the lens array or a change in a focal length, and the correction calculating portion may be configured to correct, based on the magnification, the image pickup signal generated in the image pickup region.

In accordance with this configuration, even if the temperature changes, and the refractive index of the lens array or the focal length changes, the change in the magnification of the image taken in the image pickup region which change is caused by the change in the refractive index or the focal length can be compensated.

The correction coefficient generating portion may generate the magnification correlation correction coefficients corresponding to the plurality of image pickup regions such that the magnification correlation correction coefficients change at a same rate in accordance with a change in the temperature.

In the image pickup apparatus configured using one barrel and one lens array including a plurality of lenses, one magnification correlation correction coefficient is generated for a plurality of image pickup regions. Therefore, a calculating time can be reduced. Thus, it is possible to realize the image pickup apparatus configured to calculate distances with high accuracy at low cost.

Moreover, a semiconductor circuit element of the present invention is a semiconductor circuit element used in an image pickup apparatus including: a lens array having a plurality of lenses; and a plurality of image pickup regions disposed to correspond to the plurality of lenses one-to-one and each including a light receiving surface substantially perpendicular to a direction in which an optical axis of the corresponding lens extends, the semiconductor circuit element including: a correction coefficient generating portion configured to generate, based on a temperature detected by a temperature sensor disposed in a vicinity of the lens array, correction coefficients including correction coefficients (hereinafter referred to as "magnification correlation correction coefficients") correlated to magnifications of images taken in the image pickup regions; and a correction calculating portion configured to correct, based on the correction coefficients, image pickup signals generated in the image pickup regions and calculate a parallax using the corrected image pickup signals.

In accordance with this configuration, based on the correction coefficient which is generated based on the temperature detected by the temperature sensor and correlated to the magnification of the image taken in the image pickup region, the image pickup signal generated in the image pickup region is corrected, and/or the parallax is calculated using the corrected image pickup signal. Therefore, even if the temperature changes, and the magnification of the taken image changes, the change in the magnification due to the temperature change can be compensated. As a result, the distance measurement can be carried out with high accuracy.

The above object, other objects, features and advantages of the present invention will be made clear by the following detailed explanation of preferred embodiments with reference to the attached drawings.

Advantageous Effects of Invention

In accordance with the present invention, even if a temperature changes, and a magnification of a taken image changes, the magnification is compensated, so that the distance measurement can be carried out with high accuracy.

BRIEF DESCRIPTION OF DRAWINGS

FIG. 11 are diagrams for explaining a change in a refractive index with respect to a temperature and a change in a focal length with respect to a temperature according to Embodiment 1 of the present invention.

FIG. 15 is a diagram for explaining a coefficient storing portion according to Embodiment 1 of the present invention.

DESCRIPTION OF EMBODIMENTS

Hereinafter, preferred embodiments of the present invention will be explained in reference to the drawings.

Embodiment 1

An image pickup apparatus according to Embodiment 1 of the present invention corrects an image such that: the amount of change in an interval between optical axes of a plurality of lenses is calculated based on a temperature detected by a temperature sensor; and each of origin points of the optical axes of the plurality of lenses is moved by half the amount of change to cancel distortion around the origin point of the optical axis. With this, influences of the distortion can be appropriately reduced. Therefore, the image pickup apparatus can detect highly accurate parallaxes and measure distances with high accuracy. In addition, since a magnification of the image is corrected based on the temperature detected by the temperature sensor, the image pickup apparatus can measure the distances with further high accuracy.

Configuration and Operation

Figure 1:
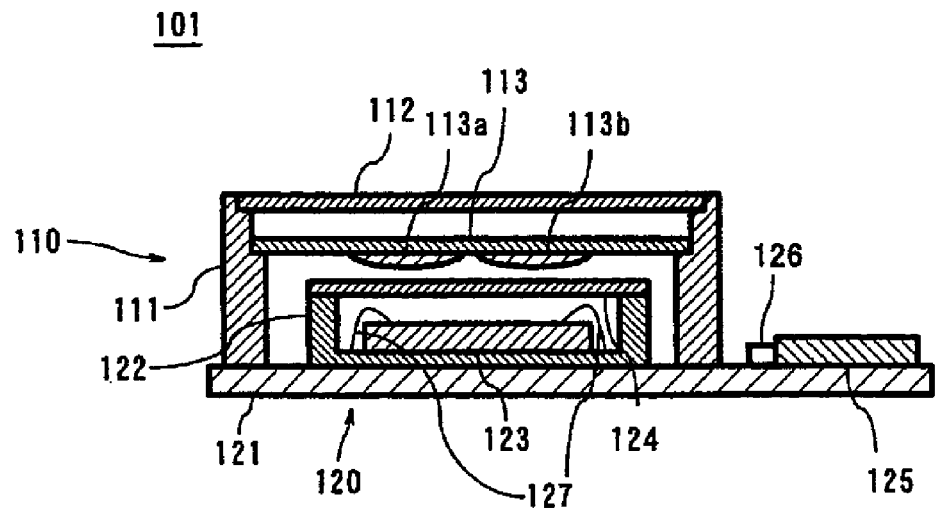
FIG. 1 is a cross-sectional view showing the configuration of an image pickup apparatus according to Embodiment 1 of the present invention.

FIG. 1 is a cross-sectional view showing the configuration of the image pickup apparatus according to Embodiment 1 of the present invention. As shown in FIG. 1, an image pickup apparatus 101 includes a circuit portion 120 and a lens module portion 110 disposed above the circuit portion 120.

The lens module portion 110 includes a cylindrical barrel 111, an upper cover glass 112 covering an opening of the barrel 111, and a lens array 113 disposed under the upper cover glass 112 and inside the barrel 111. Moreover, the circuit portion 120 includes a substrate 121, a package 122 disposed on the substrate 121, an image pickup element 123, a package cover glass 124, a system LSI (hereinafter referred to as "SLSI") 125 that is a semiconductor circuit element, and a temperature sensor 126 configured to detect a temperature of a portion in the vicinity of the lens array 113.

As described above, the barrel 111 has a cylindrical shape. An inner wall surface of the barrel 111 is painted with matte black to prevent diffused reflection of light. The barrel 111 is formed by injection molding of a resin. The upper cover glass 112 has a disc shape and is formed by an optical glass material, a transparent resin, or the like. The upper cover glass 112 is fixed to an inner wall of an upper portion of the barrel 111 by an adhesive or the like. A protective coating for preventing damages by friction or the like and an antireflection coating for preventing reflection of incident light are disposed on a surface of the upper cover glass 112.

Figure 2:
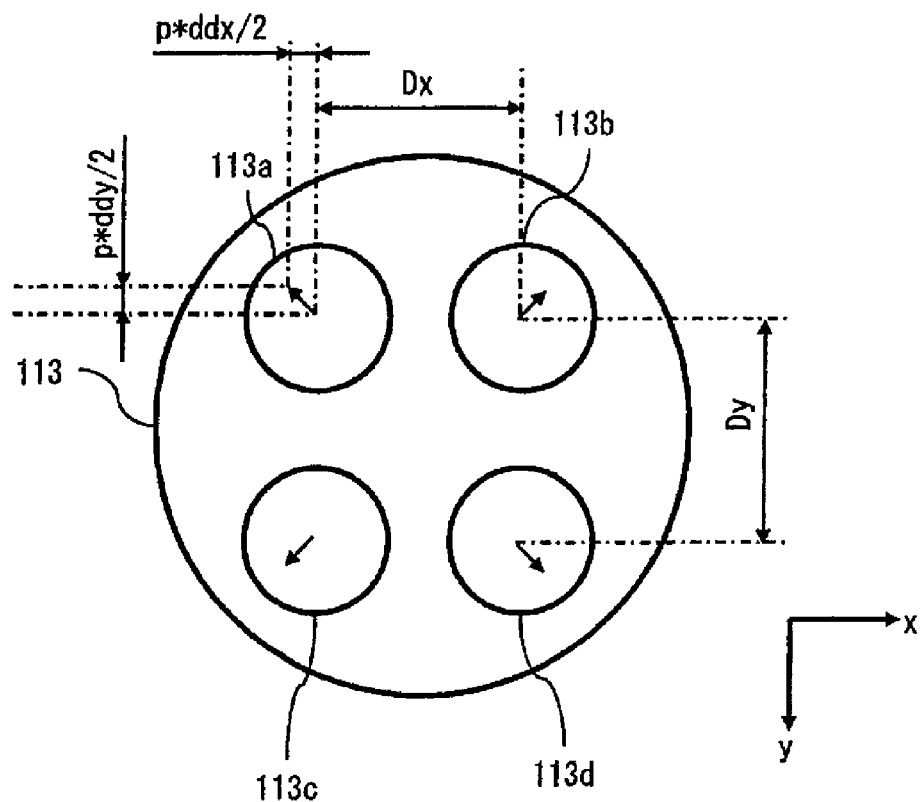
FIG. 2 is a plan view showing the configuration of a lens array of the image pickup apparatus according to Embodiment 1 of the present invention.

FIG. 2 is a plan view showing the configuration of the lens array of the image pickup apparatus according to Embodiment 1 of the present invention. The lens array 113 has a substantially disc shape and is formed by an optical glass material, a transparent resin, or the like. In the lens array 113, a circular first lens portion 113a, a circular second lens portion 113b, a circular third lens portion 113c, and a circular fourth lens portion 113d are arranged in two rows and two columns in a grid pattern. As shown in FIG. 2, x-axis and y-axis are set along directions in which the first to fourth lens portions 113a to 113d are arranged. In the first lens portion 113a, the second lens portion 113b, the third lens portion 113c, and the fourth lens portion 113d, light incident from a subject side is emanated toward the image pickup element 123 side, and four images are formed on the image pickup element 123. As shown in FIG. 2, the optical axis of the first lens portion 113a and the optical axis of the second lens portion 113b are spaced apart from each other by Dx in an x-axis direction and coincide with each other in a y-axis direction. The optical axis of the first lens portion 113a and the optical axis of the third lens portion 113c coincide with each other in the x-axis direction and are spaced apart from each other by Dy in the y-axis direction. The optical axis of the third lens portion 113c and the optical axis of the fourth lens portion 113d are spaced apart from each other by Dx in the x-axis direction and coincide with each other in the y-axis direction. The optical axis of the fourth lens portion 113d and the optical axis of the first lens portion 113a are spaced apart from each other by Dx in the x-axis direction and by Dy in the y-axis direction.

The substrate 121 is constituted by a resin substrate. A bottom surface of the barrel 111 contacts an upper surface of the substrate 121 to be fixed to the upper surface by an adhesive or the like. Thus, the lens module portion 110 and the circuit portion 120 are fixed to constitute the image pickup apparatus 101.

The package 122 is made of resin having metal terminals. The package 122 is fixed such that inside the barrel 111, the metal terminals thereof are, for example, soldered to the upper surface of the substrate 121.

The image pickup element 123 is a solid-state image pickup element, such as a CCD sensor or a CMOS sensor, and is disposed such that a light receiving surface thereof is substantially perpendicular to the optical axes of the first lens portion 113a, the second lens portion 113b, the third lens portion 113c, and the fourth lens portion 113d. Respective terminals of the image pickup element 123 are connected to the metal terminals at a bottom portion inside the package 122 by gold wires 127 using wire bonding, and are electrically connected to the SLSI 125 via the substrate 121. Light emanating from the first lens portion 113a, the second lens portion 113b, the third lens portion 113c, and the fourth lens portion 113d form images on the light receiving surface of the image pickup element 123, this light information is converted into electric information by a photodiode, and this electric information is transferred to the SLSI 125.

Figure 3:
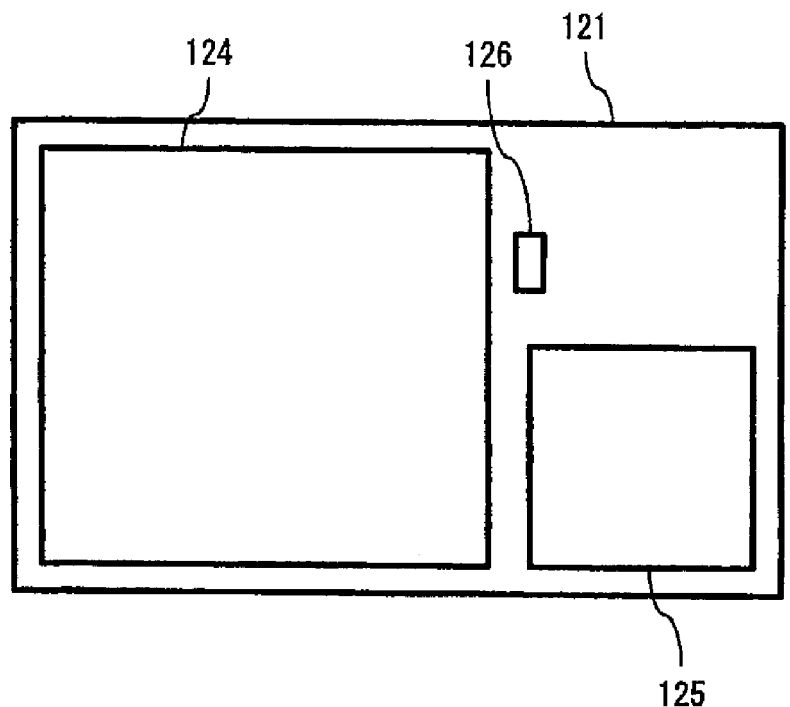
FIG. 3 is a plan view showing the configuration of a circuit portion of the image pickup apparatus according to Embodiment 1 of the present invention.

FIG. 3 is a plan view showing the configuration of the circuit portion 120 of the image pickup apparatus according to Embodiment 1 of the present invention. The package cover glass 124 has a flat plate shape, is formed by a transparent resin, and is fixed to an upper surface of the package 122 by an adhesive or the like. In FIG. 3, for convenience sake, the image pickup element 123 and the like which can be seen through the package cover glass 124 are omitted.

In accordance with the following method, the SLSI 125 drives the image pickup element 123, receives the electric information from the image pickup element 123, carries out various calculations, communicates with a higher-level CPU, and outputs image information, distance information, and the like to outside. The SLSI 125 is connected to a power supply (3.3 V for example) and a ground (0 V for example).

Figure 4:
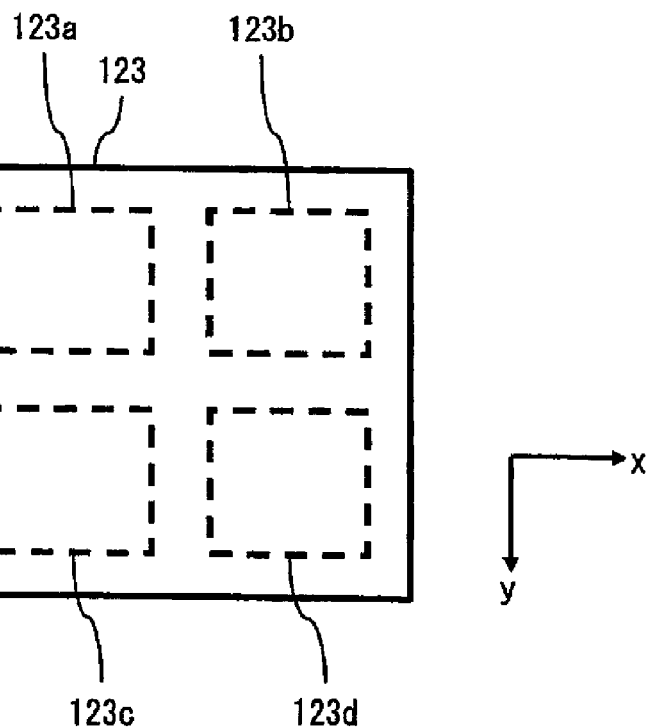
FIG. 4 is a plan view showing the configuration of an image pickup element of the image pickup apparatus according to Embodiment 1 of the present invention.

FIG. 4 is a plan view showing the configuration of the image pickup element of the image pickup apparatus according to Embodiment 1 of the present invention. As shown in FIG. 4, the image pickup element 123 is configured to include a first image pickup region 123a, a second image pickup region 123b, a third image pickup region 123c, and a fourth image pickup region 123d. The first to fourth image pickup regions 123a to 123d are arranged in two rows and two columns such that light receiving surfaces thereof are substantially perpendicular to the optical axes of the first to fourth lens portions 113a to 113d, respectively. The image pickup signals are generated in the image pickup regions 123a to 123d.

Figure 5:
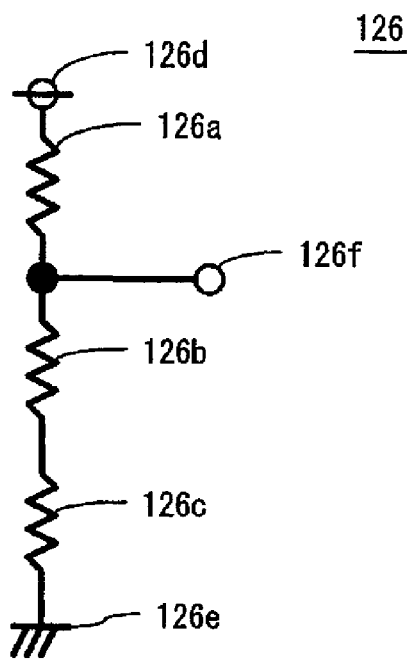
FIG. 5 is a circuit diagram of a temperature sensor of the image pickup apparatus according to Embodiment 1 of the present invention.

FIG. 5 is a circuit diagram of the temperature sensor of the image pickup apparatus according to Embodiment 1 of the present invention. As shown in FIG. 5, the temperature sensor 126 is configured such that a first fixed resistor 126a, a thermistor 126b, and a second fixed resistor 126c are connected in series. Here, the other end (end opposite an end to which the thermistor 126b is connected) of the first fixed resistor 126a is connected to a power supply 126d (3.3 V for example), and the other end (end opposite an end to which the thermistor 126b is connected) of the second fixed resistor 126c is connected to a ground 126e (0 V for example; the same potential as the ground of the SLSI 125). Moreover, a connecting point 126f where the first fixed resistor 126a and the thermistor 126b are connected to each other is connected to the SLSI 125.

Next, a relation between a subject distance and the parallax will be explained. Since the image pickup apparatus according to Embodiment 1 of the present invention has four lens portions (the first lens portion 113a, the second lens portion 113b, the third lens portion 113c, and the fourth lens portion 113d), relative positions of four object images formed by four lens portions, respectively, change depending on the subject distance.

Figure 6:
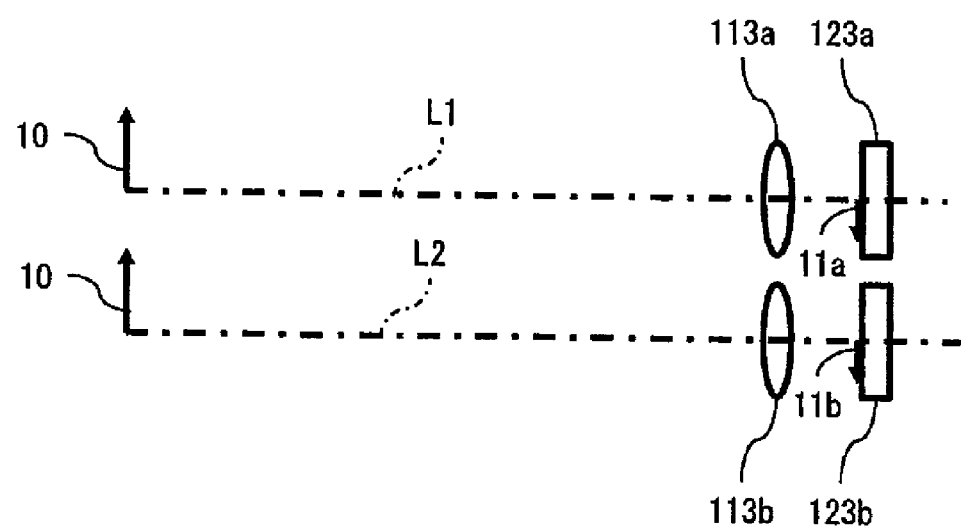
FIG. 6 is a diagram for explaining a position of an image of an object positioned at infinity in the image pickup apparatus according to Embodiment 1 of the present invention.

FIG. 6 is a diagram for explaining a position of an image of an object positioned at infinity in the image pickup apparatus according to Embodiment 1 of the present invention. In FIG. 6, for simplicity, only the first lens portion 113a and the second lens portion 113b of the lens array 113 are shown. Typical incident light L1 that is light incident from an object 10 at infinity to the first lens portion 113a and typical incident light L2 that is light incident from the object 10 at infinity to the second lens portion 113b are in parallel with each other (here, two objects 10 are shown, but the object 10 is only one. The object 10 at infinity cannot be shown on a finite sheet. Therefore, in order to clearly show that the incident light L1 and the incident light L2 are in parallel with each other, the object 10 at infinity at two positions is shown.). Therefore, a distance between the optical axis of the first lens portion 113a and the optical axis of the second lens portion 113b is equal to a distance between a position where an object image 11a is formed and a position where an object image 11b is formed on the image pickup element 123. That is, there is no parallax.

Figure 7:
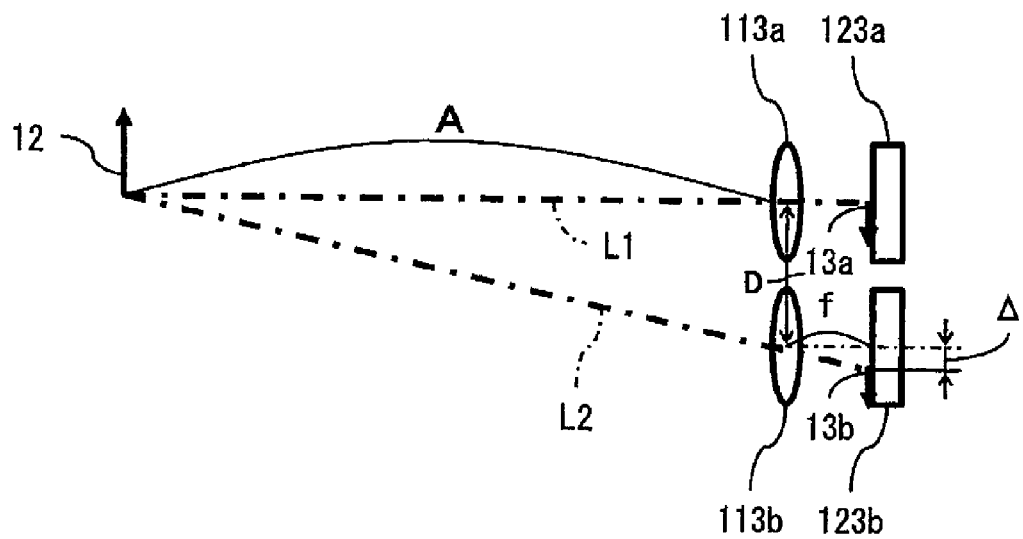
FIG. 7 is a diagram for explaining a position of the image of the object positioned at a finite distance in the image pickup apparatus according to Embodiment 1 of the present invention.

FIG. 7 is a diagram for explaining a position of the object positioned at a finite distance in the image pickup apparatus according to Embodiment 1 of the present invention. In FIG. 7, for simplicity, only the first lens portion 113a and the second lens portion 113b of the lens array 113 are shown. The typical incident light L1 that is light incident from an object 12 at the finite distance to the first lens portion 113a and the typical incident light L2 that is light incident from the object 12 at the finite distance to the second lens portion 113b are not in parallel with each other. Therefore, a distance between a position where an object image 13a is formed and a position where an object image 13b is formed on the image pickup element 123 is longer than the distance between the optical axis of the first lens portion 113a and the optical axis of the second lens portion 113b. That is, there exists the parallax.

In a case where a distance (subject distance) from a principal point of the first lens portion 113a to the object (subject) 12 is denoted by A, the distance between the optical axis of the first lens portion 113a and the optical axis of the second lens portion 113b is denoted by D, and a focal length of each of the lens portions 113a and 113b is denoted by f, a parallax value Δ is represented by Formula (7) below since a right angled triangle whose two sides sandwiching a right angle have lengths of A and D, respectively and a right angled triangle whose two sides sandwiching a right angle have lengths of f and Δ, respectively, are similar to each other in FIG. 7.

$$\Delta = f^{*}D/A \quad (7)$$

The same relation as above is true regarding the other lens portions. Thus, the relative positions of four object images formed by four lens portions 113a, 113b, 113c, and 113d, respectively, change depending on the subject distance. For example, the parallax value Δ increases as the subject distance A decreases. By solving Formula (7) regarding the subject distance A as shown by Formula (8) below, the subject distance A can be obtained from the parallax value Δ.

$$A = f^{*}D/\Delta \quad (8)$$

Next, a principle of a temperature compensation of the center of the optical axis will be explained. As shown by the arrows in FIG. 2, the center of each optical axis moves toward an outer side of the lens by the expansion of the lens array 113 due to the temperature increase. Assuming that the lens array isotropically expands in proportion to the temperature increase, the interval between the centers of the optical axes can be shown by Formulas (9) and (10) below. Here, ddx denotes the amount of change in the interval between the optical axes in the x direction due to the temperature increase, and used as a unit thereof is a pitch of light receiving elements of the image pickup element 123. Moreover, ddy denotes the amount of change in the interval between the optical axes in the y direction due to the temperature increase, and used as a unit thereof is the pitch of the light receiving elements of the image pickup element 122. Moreover, Dx denotes the interval between the optical axes of the lenses in the x direction at a reference temperature Th0, Dy denotes the interval between the optical axes of the lenses in the y direction at the reference temperature Th0, aL denotes the linear thermal expansion coefficient of the lens array 113, aS denotes the linear thermal expansion coefficient of the image pickup element 123, T denotes a temperature, Th0 denotes the reference temperature, and p denotes the pitch of the light receiving elements of the image pickup element 123.

$$ddx = Dx^{*}(aL-aS)^{*}(T-Th0)/p \quad (9)$$

$$ddy = Dy^{*}(aL-aS)^{*}(T-Th0)/p \quad (10)$$

Since the centers of the optical axes of the lens portions isotropically expand due to the temperature increase, as shown in FIG. 2, each of the centers of the optical axes of the lens portions is moved by half the change in the interval between the optical axes of the lenses due to the temperature increase (p*ddx/2 in the x direction and p*ddy/2 in the y direction). To be specific, the center of the optical axis of the first lens portion 113a is moved by −p*ddx/2 in the x direction and −p*ddy/2 in the y direction. The center of the optical axis of the second lens portion 113b is moved by +p*ddx/2 in the x direction and −p*ddy/2 in the y direction. The center of the optical axis of the third lens portion 113c is moved by −p*ddx/2 in the x direction and +p*ddy/2 in the y direction. The center of the optical axis of the fourth lens portion 113d is moved by +p*ddx/2 in the x direction and +p*ddy/2 in the y direction.

Therefore, the temperature T is detected, the changes ddx and ddy in the interval between the optical axes of the lenses of the lens array 113 are calculated based on the temperature T, and the optical axes of the lenses of the lens array 113 are compensated on the assumption that each of the optical axes moves by half the change ddx and half the change ddy. With this, the influences of the expansion of the lens array 113 due to the temperature change can be reduced, and the accurate parallax can be calculated. Therefore, the accurate distance can be obtained.

Figure 8A:
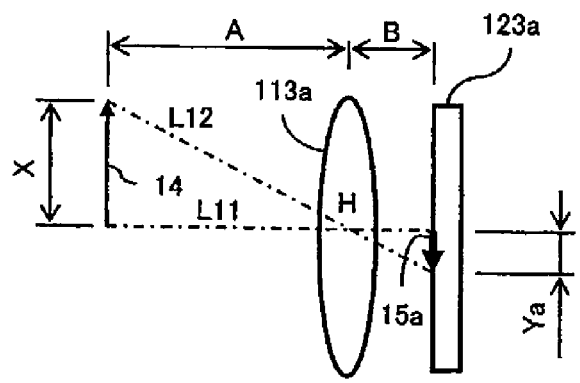
FIG. 8 are diagrams for explaining a change in a magnification by the extension of a barrel according to Embodiment 1 of the present invention.
Figure 8B:
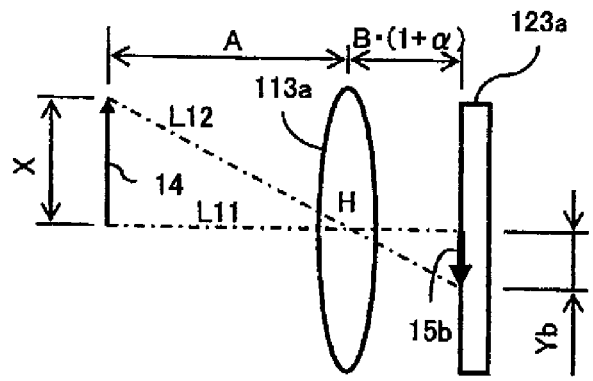

Next, a principle of a temperature correction for reducing the influence of the extension of the barrel due to the temperature change will be explained. FIG. 8 are diagrams for explaining a change in a magnification by the extension of the barrel according to Embodiment 1 of the present invention. In FIG. 8, for ease of explanation, only components related to the first lens portion 113a are shown. FIG. 8(a) is a diagram for explaining the magnification at the reference temperature Th0, and FIG. 8(b) is a diagram for explaining the magnification at a temperature Th that is higher than the reference temperature. As shown in FIG. 8(a), at the reference temperature Th0, a distance from a principal point H of the first lens portion 113a to a subject 14 is denoted by A, and a distance from the principal point H of the first lens portion 113a to a subject image 15a on the first image pickup region 123a is denoted by B. A main light beam L11 from a lower end of the subject 14 is emanated from the lower end of the subject 14, passes through the principal point H of the first lens portion 113a, and reaches an upper end of the subject image 15a. A main light beam from an upper end of the subject 14 is emanated from the upper end of the subject 14, passes through the principal point H of the first lens portion 113a, and reaches a lower end of the subject image 15a. Here, a triangle formed by connecting the lower end and upper end of the subject 14 and the principal point H and a triangle formed by connecting the upper end and lower end of the subject image 15a and the principal point H are similar to each other. Therefore, as shown by Formula (110) below, a magnification β(Th0) at the reference temperature Th0, i.e., a magnification shown by a ratio of a length Ya of the subject image 15a to a length X of the subject 14 is a ratio of a distance B from the principal point H to the subject image 15a to a distance A from the subject 14 to the principal point H.

$$\beta(Th0) = Ya/X = B/A \quad (110)$$

As shown in FIG. 8(b), at the temperature Th, the distance from the principal point H of the first lens portion 113a to the subject 14 is denoted by A, and a distance from the principal point H of the first lens portion 113a to a subject image 15b on the first image pickup region 123a is denoted by B·(1+α). Since the barrel 111 extends by the temperature increase, the distance from the principal point H of the first lens portion 113a to the subject image 15b on the first image pickup region 123a increases by α times at the temperature Th as compared to the reference temperature Th0. The main light beam L11 from the lower end of the subject 14 is emanated from the lower end of the subject 14, passes through the principal point H of the first lens portion 113a, and reaches an upper end of the subject image 15b. The main light beam from the upper end of the subject 14 is emanated from the upper end of the subject 14, passes through the principal point H of the first lens portion 113a, and reaches a lower end of the subject image 15b. Here, the triangle formed by connecting the lower end and upper end of the subject 14 and the principal point H and a triangle formed by connecting the upper end and lower end of the subject image 15b and the principal point H are similar to each other. Therefore, as shown by Formula (111) below, a magnification β(Th) at the temperature Th, i.e., a magnification shown by a ratio of a length Yb of the subject image 15b to the length X of the subject 14 is a ratio of the distance B·(1+α) from the principal point H to the subject image 15b to the distance A from the subject 14 to the principal point H. As is clear from a comparison between Formula (110) and Formula (111), in a case where the temperature increases from the reference temperature Th0 to the temperature Th, the barrel extends or shrinks by α times the original length, and the length of the barrel changes by the increase or decrease in the distance B from the principal point H to the first image pickup region 123a by the expansion of the barrel (to be specific, the distance increases or decreases from B to B·(1+α)), and the magnification increases or decreases by 1+α times (to be specific, the magnification increases or decreases from B/A to B·(1+α)/A). Hereinafter, the present embodiment explains an example in which the length of the barrel has increased (to be specific, α>0).

$$\beta(Th)=Yb/X=B\cdot(1+\alpha)/A \tag{111}$$

Figure 9A:
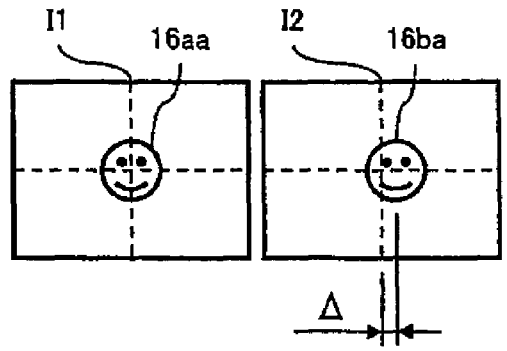
FIG. 9 are diagrams for explaining a principle of a temperature correction of the extension of the barrel according to Embodiment 1 of the present invention.
Figure 9B:
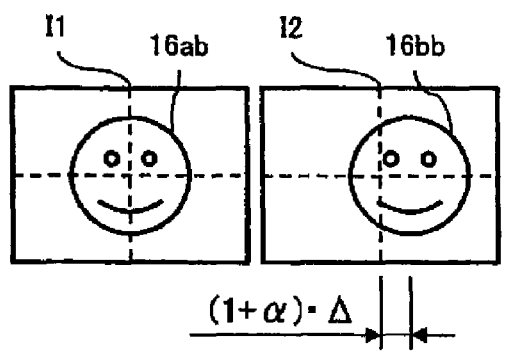
Figure 9C:
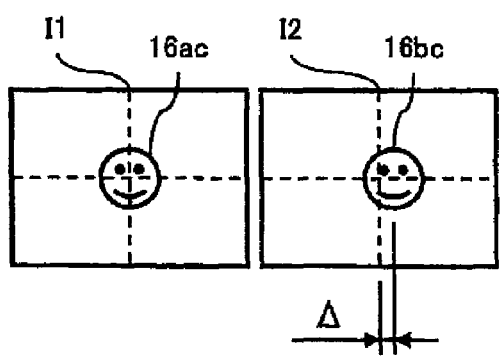

FIG. 9 are diagrams for explaining a principle of the temperature correction of the extension of the barrel according to Embodiment 1 of the present invention. In FIG. 9, for ease of explanation, only a first image pickup signal I1 corresponding to the first lens portion 113a and a second image pickup signal I2 corresponding to the second lens portion 113b are shown. Moreover, in FIG. 9, the changes in the interval between the optical axes of the lenses are suitably corrected. FIG. 9(a) shows the image and the parallax at the reference temperature Th0. FIG. 9(b) shows the image and the parallax at the temperature Th higher than the reference temperature before the correction of the extension of the barrel. FIG. 9(c) shows the image and the parallax at the temperature Th higher than the reference temperature after the correction of the extension of the barrel. As shown in FIG. 9(a), at the reference temperature Th0, a subject image 16aa is taken in the first image pickup signal I1, a subject image 16ba is taken in the second image pickup signal I2, and the parallax is Δ. Here, in a case where the temperature increases from the reference temperature Th0 to the temperature Th, the magnification increases by 1+α times as shown by Formula (111). Therefore, in a case where the image of the same subject is taken, each of the size of a subject image 16ab taken in the first image pickup signal I1 and the size of a subject image 16bb taken in the second image pickup signal I2 increases by 1+α times as shown in FIG. 9(b). On this account, the parallax increases by 1+α times (to be specific, the parallax becomes Δ·(1+α)). Here, as shown in FIG. 9(c), the first image pickup signal I1 and the second image pickup signal I2 are corrected such that the subject images 16ab and 16bb increased in size by 1+α times respectively become the same in size as the subject images 16aa and 16ba at the reference temperature Th0 (such that the size of the image becomes 1/(1+α) times). Thus, subject images 16ac and 16bc are formed. The sizes of the subject images 16ac and 16bc respectively become the same as the sizes of the subject images 16aa and 16ba at the reference temperature Th0. Therefore, the parallax in FIG. 9(c) becomes Δ, i.e., coincides with the parallax Δ at the reference temperature Th0.

Figure 10A:
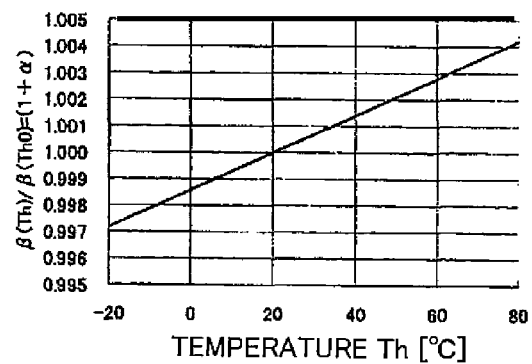
FIG. 10 are diagrams for explaining effects of the temperature correction of the extension of the barrel according to Embodiment 1 of the present invention.
Figure 10B:
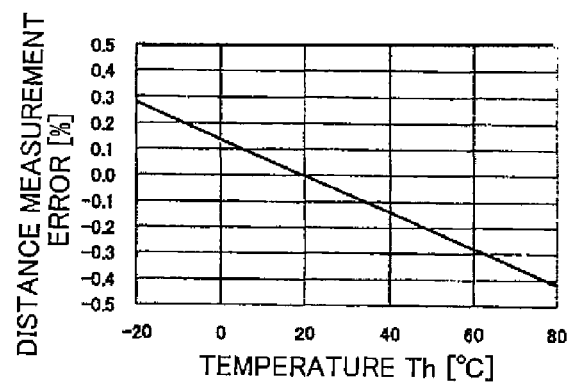
Figure 10C:
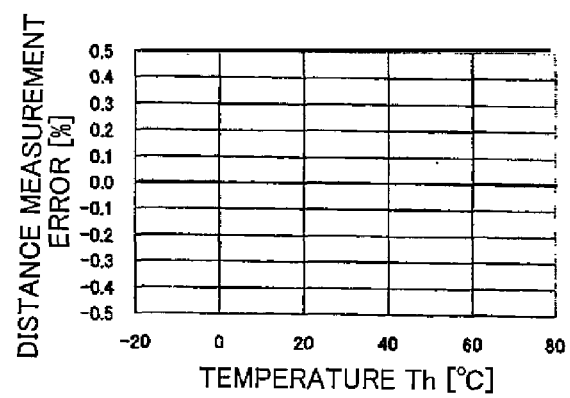

FIG. 10 are diagrams for explaining effects of the temperature correction of the extension of the barrel according to Embodiment 1 of the present invention. As described above, in a case where the temperature Th changes, the magnification of the image taken in each image pickup region changes due to the extension or shrinkage of the barrel by the expansion of the barrel. FIG. 10(a) shows a ratio (1+α) of the magnification β(Th) at the temperature Th to the magnification β(Th0) at the reference temperature Th0 (in FIG. 10, the reference temperature Th0 is set to 20° C.). The ratio (1+α) is 1 (α=0) at the reference temperature Th0, 1 or higher (α is 0 or higher) at the reference temperature Th0 or higher, and 1 or lower (α is 0 or lower) at the reference temperature Th0 or lower. As the temperature Th gets away from the reference temperature Th0, the ratio (1+α) of the magnification β(Th) at the temperature Th to the magnification β(Th0) at the reference temperature Th0 gets away from 1. As described above, the parallax Δ changes in the same manner. Here, the subject distance A is inversely proportional to the parallax Δ in Formula (8) and is calculated based on the parallax Δ in accordance with Formula (8). Therefore, in a case where a distance measurement calculation is carried out without carrying out the correction regarding the change in the magnification of the taken image due to the extension of the barrel, and the temperature Th is not the reference temperature Th0, a distance measurement error occurs as shown in FIG. 10(b). As described above, the correction regarding the change in the magnification of the taken image due to the extension of the barrel is carried out, so that the magnification becomes the same as the magnification at the reference temperature Th0, and the parallax becomes the same as the parallax at the reference temperature Th0. With this, as shown in FIG. 10(c), the distance measurement error caused by the temperature change can be prevented.

As above, in a case where the temperature changes from the reference temperature, the magnification of the image changes by the extension of the barrel. Therefore, a magnification correction of correcting the size of the image to cancel the change in the magnification of the image is carried out. With this, the parallax can be calculated properly even if the temperature changes. On this account, the distance measurement can be carried out always properly even if the temperature changes.

The distance measurement error α can be calculated by multiplying a linear thermal expansion coefficient of a material used for the barrel and an allowable temperature change range. Therefore, for example, in a case where the linear thermal expansion coefficient of a common resin used for a resin barrel is 0.00007 [/° C.], and the allowable temperature change range for an in-vehicle application or the like is 100° C. (the temperature is assumed to change from −20 to 80° C.), the distance measurement error α in FIG. 10 becomes 0.007 (=0.00007×100), i.e., about 0.7% (±0.35% with respect to a center value). Here, the accuracy required for a distance measuring device may be ±1% or less. Therefore, in a case where the distance measurement error due to the change in the length of the barrel is ±0.35% with respect to the center value, the distance measurement error due to the change in the length of the barrel occupies one third of the accuracy required for the distance measuring device. The distance measurement error occurs due to various factors in addition to the change in the length of the barrel. Therefore, removing the influence of the error due to the change in the length of the barrel which error occupies one third of the accuracy required for the distance measuring device is important to realize a distance measurement accuracy of +1% or less.

Here, as in the present embodiment, the distance measurement error can be significantly reduced by correcting the change in the length of the barrel due to the temperature change. With this, even if the barrel is manufactured using a resin which realizes mass production at low cost by molding, a high-accuracy distance measuring device can be realized.

Next, a principle of the temperature correction of the focal length will be explained. FIG. 11 are diagrams for explaining a change in a refractive index with respect to a temperature and a change in a focal length with respect to a temperature according to Embodiment 1 of the present invention. As shown in FIG. 11(*a*), in a case where the temperature increases, the refractive index of the lens array 113 decreases. Then, the focal length f of the first lens portion 113*a* changes. FIG. 11(*b*) shows a ratio of the focal length f at the temperature Th to the focal length f at the reference temperature Th0 (in FIG. 11, the reference temperature Th0 is set to 20° C.). The ratio is 1 at the reference temperature Th0, 1 or higher at the reference temperature Th0 or higher, and 1 or lower at the reference temperature Th0 or lower. As the temperature gets away from the reference temperature Th0, the ratio gets away from 1.

Figure 12:
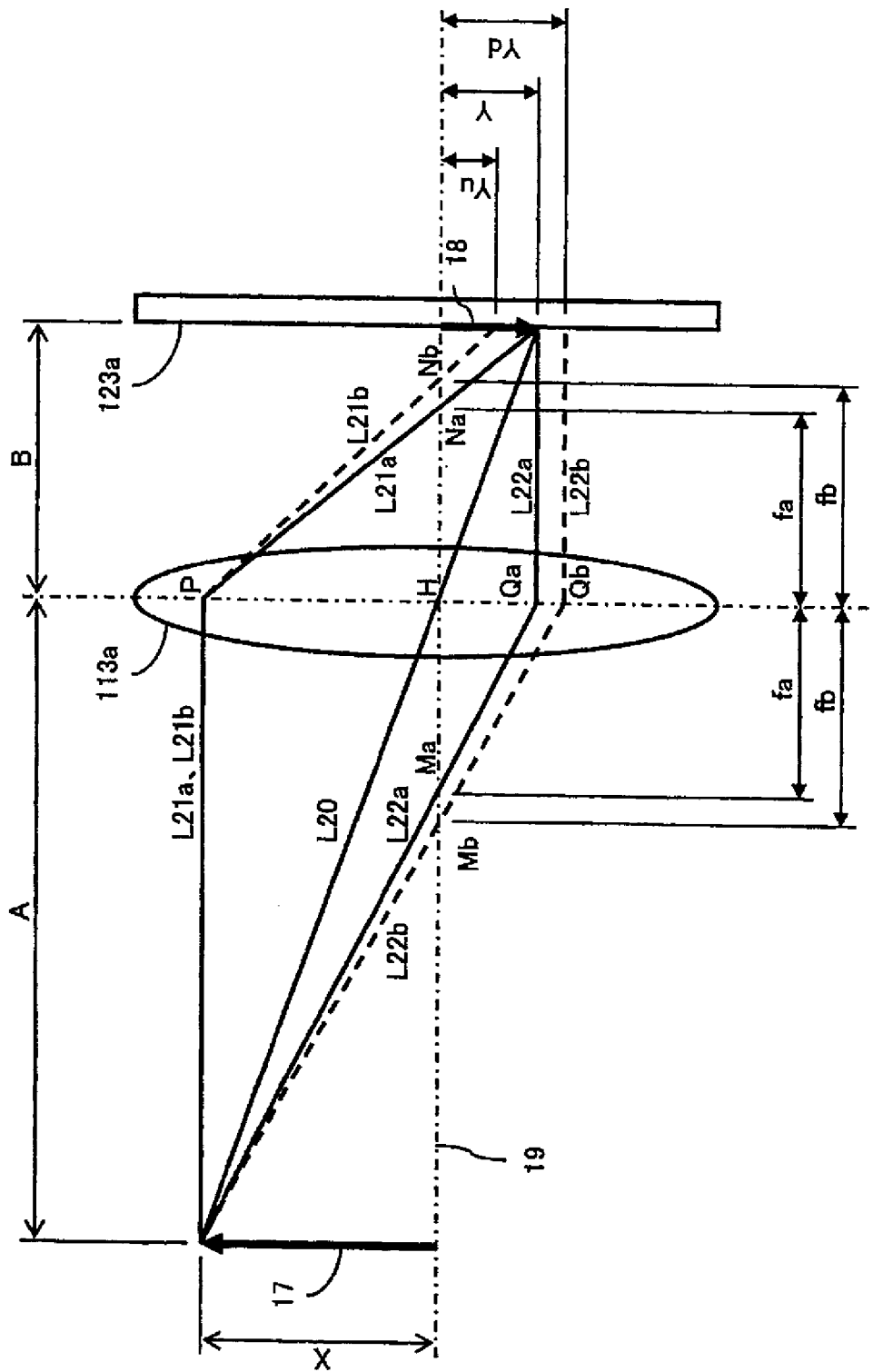
FIG. 12 is a diagram for explaining the change in the magnification by the change in the focal length according to Embodiment 1 of the present invention.

FIG. 12 is a diagram for explaining the change in the magnification by the change in the focal length according to Embodiment 1 of the present invention. In FIG. 12, for ease of explanation, only components related to the first lens portion 113*a* are shown. In FIG. I2, respective components are arranged such that focus is achieved on the first image pickup region 123*a* in a case where the subject distance is A, and the focal length of the first lens portion 113*a* is fa. Therefore, ideally, any light emanated from one point of a subject 17 passes through the first lens portion 113*a* and is focused on one point on the image pickup region 123*a*. To be specific, a main light beam L20 from an upper end of the subject 17 is emanated from the upper end of the subject 17, passes through the principal point H of the first lens portion 113*a*, and reaches a lower end (position away from an optical axis 19 of the first lens portion 113*a* by Y) of a subject image 18*a* on the first image pickup region 123*a* without refraction. A light beam L21*a* from the upper end of the subject 17 and parallel to the optical axis 19 is refracted at a point P, passes through a back focal point Na, and reaches the lower end (position away from the optical axis 19 by Y) of the subject image 18*a*. A light beam L22*a* from the upper end of the subject 17 and passing through a front focal point Ma is refracted at a point Qa, becomes parallel to the optical axis 19, and reaches the lower end (position away from the optical axis 19 by Y) of the subject image 18*a*.

The following will explain a case where the temperature increases and the focal length changes from fa to fb (>fa). In this case, the front focal point changes from Ma to Mb, i.e., in a direction away from the lens, and the back focal point changes from Na to Nb, i.e., in a direction away from the lens. The main light beam L20 from the upper end of the subject 17 is emanated from the upper end of the subject 17, passes through the principal point H of the first lens portion 113*a*, and reaches the lower end (position away from the optical axis 19 of the first lens portion 113*a* by Y) of the subject image 18*a* (subject image when the focal length is fa) on the first image pickup region 123*a* without refraction. A light beam L21*b* from the upper end of the upper end of the subject 17 and parallel to the optical axis 19 is refracted at the point P, passes through the back focal point Nb, and reaches a portion (position away from the optical axis 19 by Yu) closer to the optical axis 19 than the lower end of the subject image 18*a* (subject image when the focal length is fa). A light beam L22*b* from the upper end of the subject 17 and passing through the front focal point Mb is refracted at a point Qb, becomes parallel to the optical axis 19, and reaches a portion (position away from the optical axis 19 by Yd) farther from the optical axis 19 than the lower end of the subject image 18*a* (subject image when the focal length is fa). To be specific, any light emanated from one point of the subject 17 passes through the first lens portion 113*a* and is not focused on one point on the image pickup region 123*a* but is defocused. Moreover, the magnification changes since the amount of displacement of Yu with respect to Y and the amount of displacement of Yd with respect to Y are different from each other.

As above, in a case where the temperature changes, the focal length changes, and the magnification changes. As explained above in reference to FIGS. 9 and 10, the distance measurement error occurs by the change in the magnification. Here, the change in the magnification due to the change in the focal length is calculated by optical analysis or the like, i.e., the change in the magnification at the temperature Th with respect to the magnification at the reference temperature Th0 is calculated, and the magnification at the temperature Th is corrected so as to become the magnification at the reference temperature Th0.

As above, in a case where the temperature changes from the reference temperature, the magnification of the image changes by the change in the focal length. Therefore, the magnification correction of correcting the size of the image to cancel the change in the magnification of the image is carried out. With this, the parallax can be calculated properly even if the temperature changes. On this account, the distance measurement can be carried out always properly even if the temperature changes.

Next, an operation of the image pickup apparatus according to Embodiment 1 of the present invention will be explained.

Figure 13:
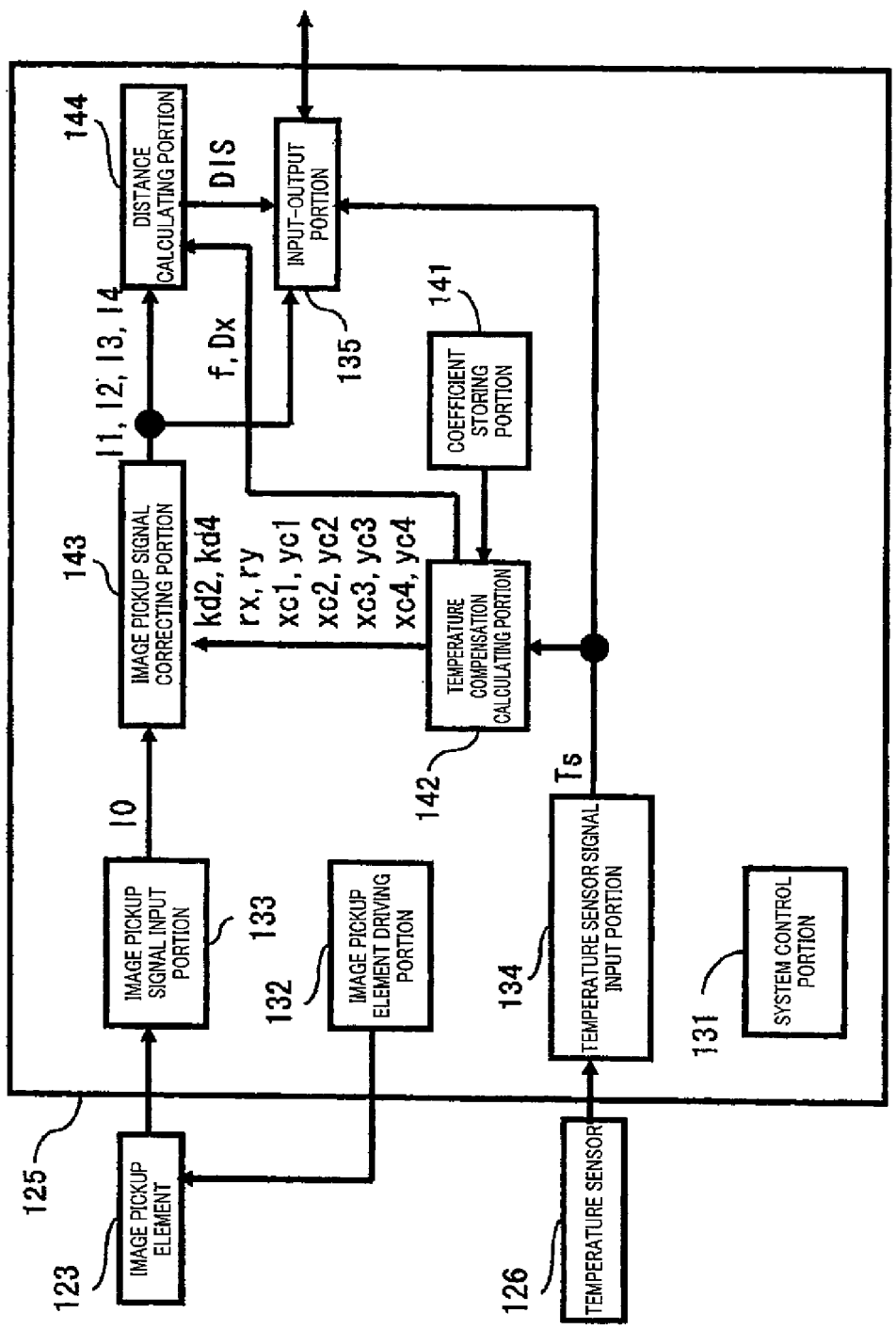
FIG. 13 is a block diagram showing the configuration of the image pickup apparatus according to Embodiment 1 of the present invention.

FIG. 13 is a block diagram showing the configuration of the image pickup apparatus according to Embodiment 1 of the present invention. The SLSI 125 includes a system control portion 131, an image pickup element driving portion 132, an image pickup signal input portion 133, a temperature sensor signal input portion 134, an input-output portion 135, a coefficient storing portion 141, a temperature compensation calculating portion (correction coefficient generating portion) 142, an image pickup signal correcting portion 143, and a distance calculating portion 144. The image pickup signal correcting portion 143 and the distance calculating portion 144 constitute a correction calculating portion.

The system control portion 131 is constituted by a CPU (Central Processing Unit), a logic circuit, or the like, and controls the entire SLSI 125. In FIG. I3, to facilitate visualization of the drawing, signals transferred between the system control portion 131 and respective blocks are not shown.

Figure 14:
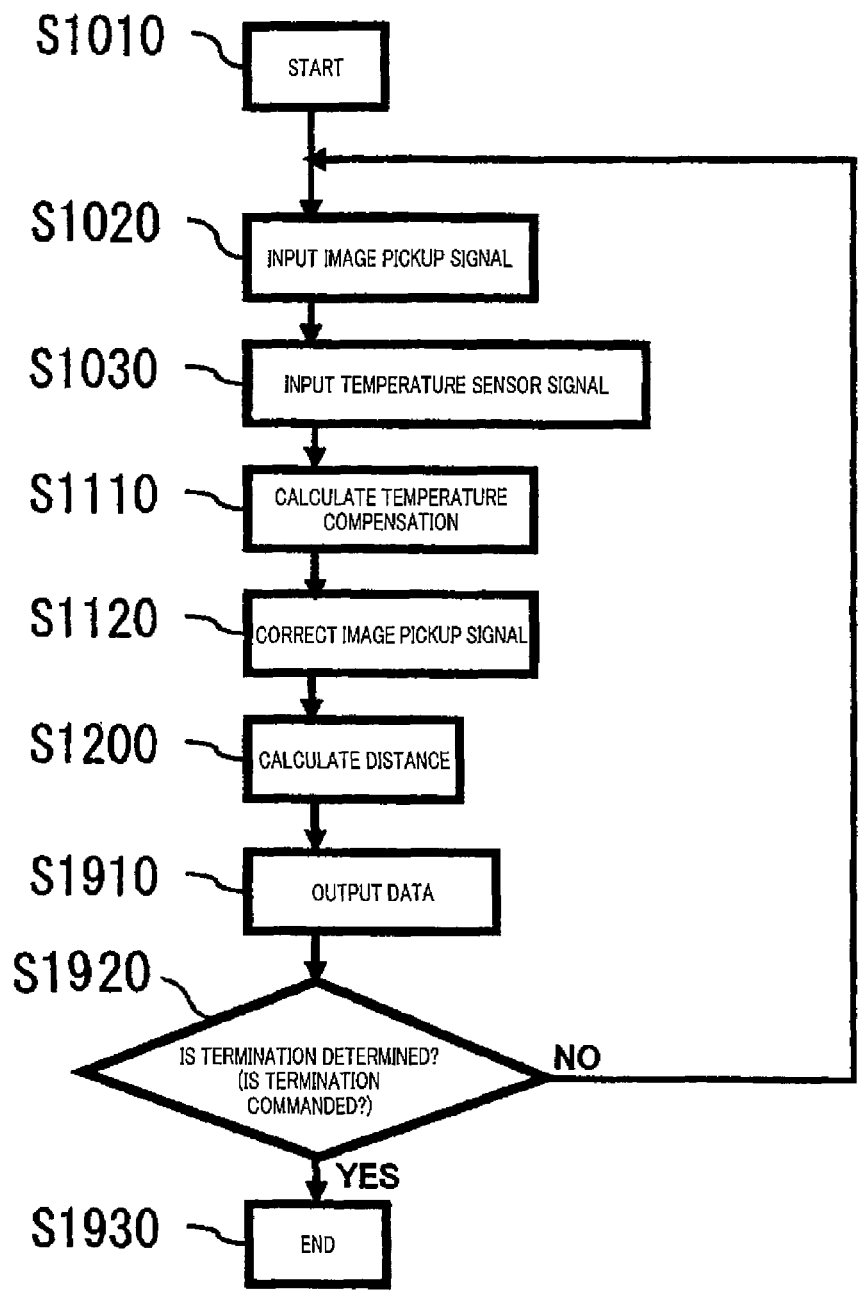
FIG. 14 is a flow chart showing an operation of the image pickup apparatus according to Embodiment 1 of the present invention.

FIG. 14 is a flow chart showing the operation of the image pickup apparatus according to Embodiment 1 of the present invention. The image pickup apparatus 101 is operated by the system control portion 131 of the SLSI 125 in accordance with this flow chart.

In Step S1010, the image pickup apparatus 101 starts operating. For example, a higher-level CPU (not shown) commands the image pickup apparatus 101 (to be precise, the system control portion 131) via the input-output portion 135 to start operating. Thus, the image pickup apparatus 101 starts operating.

Next, in Step S1020, the image pickup apparatus 101 inputs the image pickup signal. Specifically, the image pickup element driving portion 132 is constituted by, for example, a logic circuit. By the command of the system control portion 131, the image pickup element driving portion 132 generates a signal for driving the image pickup element 123 to carry out the operation of an electronic shutter and the transfer of the signal, and applies to the image pickup element 122 a voltage corresponding to this signal. The image pickup signal input portion 133 is configured such that a CDS circuit (Correlated Double Sampling Circuit), an AGC (Automatic Gain Controller), and an ADC (Analog Digital Converter) are connected in series. The image pickup signal input portion 133 receives an electric signal from the image pickup element 123. When the electric signal is input to the image pickup signal input portion 133, the image pickup signal input portion 133 removes a fixed noise by the CDS circuit, adjusts a gain by the AGC, and converts the analog signal into a digital value by the ADC to output an image pickup signal I0. Here, the image pickup signal input portion 133 outputs H0 pixels in the x direction and V0 pixels in the y direction as the image pickup signal I0(x, y) in order of I0(0, 0) ((x, y)=(0, 0)), I0(1,0), I0(2,0), . . . , and I0(H0−1, V0−1).

Next, in Step S1030, the image pickup apparatus 101 inputs a temperature sensor signal. Specifically, the temperature sensor signal input portion 134 is constituted by, for example, an ADC (Analog Digital Converter). The temperature sensor signal input portion 134 receives the temperature sensor signal that is an analog voltage signal from the temperature sensor 126. Then, the temperature sensor signal input portion 134 converts the temperature sensor signal from the analog signal into the digital value and outputs the digital value as a temperature sensor signal Ts. In the case of using a 12-bit ADC for example, the temperature sensor signal Ts has a value in a range from 0 to 4095. The following will be explained on the basis that the temperature sensor signal Ts is generated by the 12-bit ADC.

Next, in Step S1110, the image pickup apparatus 101 carries out the temperature compensation of various coefficients. Specifically, the temperature compensation calculating portion 142 receives the temperature sensor signal Ts and uses the temperature sensor signal Ts and data stored in the coefficient storing portion 141 to output distortion coefficients kd2 and kd4, a magnification (rx, ry), a center (xc1, yc1) of the optical axis of the first lens portion 113a, a center (xc2, yc2) of the optical axis of the second lens portion 113b, a center (xc3, yc3) of the optical axis of the third lens portion 113c, a center (xc4, yc4) of the optical axis of the fourth lens portion 113d, the focal length f, and the distance Dx between the optical axes of the lens portions in the x direction.

FIG. 15 is a diagram for explaining the coefficient storing portion according to Embodiment 1 of the present invention. For simplicity, FIG. 15 shows only an x coordinate xc1 of the center of the optical axis of the first lens portion 113a. As shown in FIG. 15, the x coordinates xc1 of the center of the optical axis when the value of the temperature sensor signal Ts is 0, 256, 512, 768, 1024, . . . , 3840, and 4096 are stored in the coefficient storing portion 141 respectively as xc1__0, xc1__256, xc1__512, xc1__768, xc1__1024, . . . , xc1__3840, and xc1__4096 which are caused to correspond to respective values of the temperature sensor signals Ts. Then, the temperature compensation calculating portion 142 generates the x coordinate xc1 of the center of the optical axis corresponding to the value of the temperature sensor signal Ts through interpolation. For example, in a case where the value of the temperature sensor signal Ts is not less than 512 and less than 768, the x coordinate xc1 is generated by carrying out the interpolation as in Formula (11) below using the x coordinates xc1__512 and xc1__768 of the center of the optical axis when the temperature sensor signal Ts is 512 and 768. The other coefficients are generated in the same manner. To be specific, regarding each of a y coordinate yc1 of the center of the optical axis of the first lens portion 113a, the center (xc2, yc2) of the optical axis of the second lens portion 113b, the center (xc3, yc3) of the optical axis of the third lens portion 113c, the center (xc4, yc4) of the optical axis of the fourth lens portion 113d, the distortion coefficients k2 and k4, the magnification (rx, ry), the focal length f, and the distance Dx between the optical axes of the lens portions in the x direction, values thereof at respective temperatures are stored in the coefficient storing portion 141, and these coefficients are generated through the interpolation regarding the temperature sensor signal Ts.

$$xc1 = xc1\_512 + (Ts-512)/(768-512)*(xc\_768 - xc1\_512) \qquad (11)$$

The coefficients stored in the coefficient storing portion 141 are generated and stored in the following manner. The center of the optical axis of each lens portion is generated such that: as shown by Formulas (12) and (13) below, the amount of change ddx in the interval between the optical axes in the x direction due to the temperature increase and the amount of change ddy in the interval between the optical axes in the y direction due to the temperature increase are calculated based on Formulas (9) and (10); and the center of the optical axis of each lens portion is moved by half the amount of change ddx and half the amount of change ddy (p*ddx/2 in the x direction and p*ddy/2 in the y direction). Here, T(Ts) denotes a physical temperature represented by the value of the temperature sensor signal Ts that is the digital value converted by the ADC. Specifically, as shown by Formulas (14) and (15) below, the center (xc1, yc1) of the optical axis of the first lens portion 113a is generated so as to be moved by −ddx/2 in the x direction and −ddy/2 in the y direction from a center (xc10, yc10) of the optical axis at the reference temperature Th0. As shown by Formulas (16) and (17) below, the center (xc2, yc2) of the optical axis of the second lens portion 113b is generated so as to be moved by +ddx/2 in the x direction and −ddy/2 in the y direction from a center (xc20, yc20) of the optical axis at the reference temperature Th0. As shown by Formulas (18) and (19) below, the center (xc3, yc3) of the optical axis of the third lens portion 113c is generated so as to be moved by −ddx/2 in the x direction and +ddy/2 in the y direction from a center (xc30, yc30) of the optical axis at the reference temperature Th0. The center (xc4, yc4) of the optical axis of the fourth lens portion 113d is generated so as to be moved by +ddx/2 in the x direction and +ddy/2 in the y direction from a center (xc40, yc40) of the optical axis at the reference temperature Th0.

$$ddx = Dx*(aL-aS)*(T(Ts)-Th0)/p \qquad (12)$$

$$ddy = Dy*(aL-aS)*(T(Ts)-Th0)/p \qquad (13)$$

$$xc1 = xc10 - ddx/2 \qquad (14)$$

$$yc1 = yc10 - ddy/2 \qquad (15)$$

$$xc2 = xc20 + ddx/2 \qquad (16)$$

$$yc2 = yc20 - ddy/2 \qquad (17)$$

$$xc3 = xc30 - ddx/2 \qquad (18)$$

$$yc3 = yc30 + ddy/2 \qquad (19)$$

$$xc4 = xc40 + ddx/2 \qquad (20)$$

$$yc4 = yc40 + ddy/2 \qquad (21)$$

Values of the distortion coefficients k2 and k4 at respective temperatures are calculated and generated through optical analysis, experiment, or the like.

A length lk of the barrel is estimated as shown by Formula (22) below. Here, Th0 denotes the reference temperature, lk0 denotes the length of the barrel at the reference temperature Th0, kk denotes a linear thermal expansion coefficient of the barrel, and T(Ts) denotes the physical temperature of the temperature sensor indicated by the temperature sensor signal Ts. Here, a distance between the principal point of the lens and an image pickup surface of the image pickup region is proportional to the length of the barrel. Then, as shown by Formula (111) above, the magnification is proportional to the distance between the principal point of the lens and the image pickup surface of the image pickup region. Therefore, the magnification is proportional to the change in the length of the barrel. Here, a ratio of the length of the barrel before change to the length of the barrel after change is regarded as a magnification ratio. Specifically, as shown by Formulas (23) and (24) below, an x-direction magnification ratio rkx due to the change in the length of the barrel and a y-direction magnification ratio rky due to the change in the length of the barrel are generated.

$$lk = lk0 * \{1 + kk*(T(Ts) - Th0)\} \quad (22)$$

$$rkx = \{1 + kk*(T(Ts) - Th0)\} \quad (23)$$

$$rky = \{1 + kk*(T(Ts) - Th0)\} \quad (24)$$

Values of the change in the magnification by the change in the focal length at respective temperatures are calculated through the optical analysis or the like. As shown by Formulas (112) and (113) below, an x-direction magnification ratio rfx due to the change in the focal length and a y-direction magnification ratio rfy due to the change in the focal length are generated in accordance with the value Ts of the temperature sensor. The focal length changes mainly by the change in the refractive index. Therefore, in the case of calculating the x-direction magnification ratio rfx due to the change in the focal length and the y-direction magnification ratio rfy due to the change in the focal length through the optical analysis, the refractive index may be changed instead of the focal length.

$$rfx = rfx(Ts) \quad (112)$$

$$rfy = rfy(Ts) \quad (113)$$

Then, as shown by Formulas (114) and (115) below, an x-direction magnification rx and a y-direction magnification ry are obtained as results of multiplication of the above values and utilized for the magnification correction.

$$rx = rkx * rfx \quad (114)$$

$$ry = rky * rfy \quad (115)$$

In a case where the change in the magnification due to the change in the length of the barrel by the temperature is more significant than the change in the magnification due to the change in the focal length by the temperature, only the change in the magnification due to the change in the length of the barrel by the temperature may be corrected on the basis that each of the x-direction magnification ratio rfx by the change in the focal length and the y-direction magnification ratio rfy by the change in the focal length is regarded as 1.

In contrast, in a case where the change in the magnification due to the change in the focal length by the temperature is more significant than the change in the magnification due to the change in the length of the barrel by the temperature, only the change in the magnification due to the change in the focal length by the temperature may be corrected on the basis that each of the x-direction magnification ratio rkx by the change in the length of the barrel and the y-direction magnification ratio rky by the change in the length of the barrel is regarded as 1.

Moreover, in the optical analysis, the focal length (or the refractive index) and the extension of the barrel may be changed at the same time in accordance with the temperature, the magnifications at respective temperatures may be calculated, and the ratios to the reference temperature may be regarded as the x-direction magnification rx and the y-direction magnification ry.

The focal length at the reference temperature is used as the focal length f both in a case where the change in the magnification due to the change in the length of the barrel is corrected and in a case where the change in the magnification due to the change in the focal length is corrected.

The distance Dx between the optical axes in the x direction is generated as shown by Formula (25) below using the ddx of Formula (12) showing the amount of change in the distance between the optical axes in the x direction.

$$Dx = Dx0 + ddx*p \quad (25)$$

The coefficients measured through various methods at respective temperatures may be stored.

Next, in Step S1120, the image pickup apparatus 101 corrects and cuts out an image. Specifically, the image pickup signal correcting portion 143 receives the image pickup signal T0, the distortion coefficients kd2 and kd4, the magnification (rx, ry), the center (xc1, yc1) of the optical axis of the first lens portion 113a, the center (xc2, yc2) of the optical axis of the second lens portion 113b, the center (xc3, yc3) of the optical axis of the third lens portion 113c, and the center (xc4, yc4) of the optical axis of the fourth lens portion 113d. Then, the image pickup signal correcting portion 143 cut out from the image pickup signal I0 an image of the subject image formed by each lens portion and carries out correction processing, such as a distortion correction, of the cut-out image. Then, the image pickup signal correcting portion 143 outputs these images as the first image pickup signal I1(x, y) corresponding to the first lens portion 113a, the second image pickup signal I2(x, y) corresponding to the second lens portion 113b, the third image pickup signal I3(x, y) corresponding to the third lens portion 113c, and the fourth image pickup signal I4(x, y) corresponding to the fourth lens portion 113d.

Figure 16:
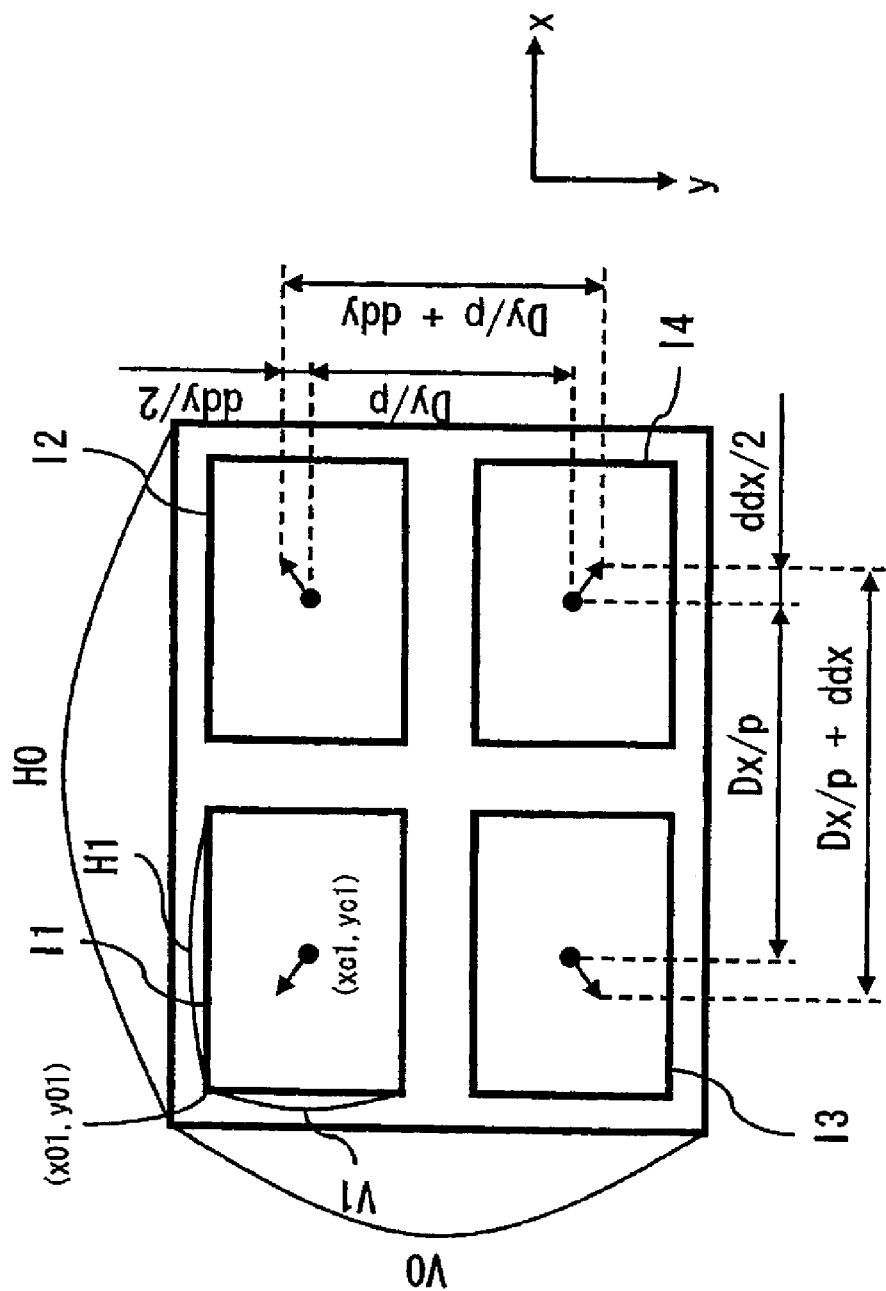
FIG. 16 is a diagram for explaining a cut-out position of an image pickup signal of the image pickup apparatus according to Embodiment 1 of the present invention.

FIG. 16 is a diagram for explaining a cut-out position of the image pickup signal in the image pickup apparatus according to Embodiment 1 of the present invention. In a case where there is no distortion and no expansion of the lens due to the temperature, as shown in FIG. 16, the first image pickup signal I1(x, y) is an image of a region cut out from the image pickup signal I0, having H1 pixels in the x direction and V1 pixels in the y direction from an origin point (x01, y01), the second image pickup signal I2(x, y) is an image of a region cut out from the image pickup signal I0, having H1 pixels in the x direction and V1 pixels in the y direction from an origin point (x02, y02), the third image pickup signal I3(x, y) is an image of a region cut out from the image pickup signal I0, having H1 pixels in the x direction and V1 pixels in the y direction from an origin point (x03, y03), and the fourth image pickup signal I4(x, y) is an image of a region cut out from the image pickup signal I0, having H1 pixel in the x direction and V1 pixels in the y direction from an origin point (x04, y04). The image pickup apparatus of Embodiment 1 carries out the following processing in consideration of the movement of the center of the optical axis due to the thermal expansion, the distortion correction, and the magnification correction.

As shown by Formulas (26), (27), and (28) below, reference coordinates (tx1, ty1) for the first image pickup signal are calculated using the distortion coefficients kd2 and kd4, the magnification (rx, ry), and the center (xc1, yc1) of the optical axis of the first lens portion 113a. As shown by Formula (29) below, the first image pickup signal I1(x, y) is calculated from the image pickup signal I0 using the reference coordinates (tx1, ty1) for the first image pickup signal. The reference coordinates (tx1, ty1) for the first image pickup signal may have a decimal point. In this case, an integer portion of the reference coordinates (tx1, ty1) for the first image pickup signal is shown by (tx1$i$, ty1$i$), and a fractional portion of the reference coordinates (tx1, ty1) for the first image pickup signal is shown by (tx1$f$, ty1$f$). Thus, the first image pickup signal I1($x, y$) is calculated using four pixels as shown by Formula (30) below. In Formulas (26), (27), (28), (29), and (30), calculations are carried out in cases where x is from 0 to H1−1 and y is from 0 to V1−1. Similarly, as shown by Formulas (31), (32), and (33) below, reference coordinates (tx2, ty2) for the second image pickup signal are calculated using the distortion coefficients kd2 and kd4, the magnification (rx, ry), and the center (xc2, yc2) of the optical axis of the second lens portion 113b. As shown by Formula (34) below, the second image pickup signal I2(x, y) is calculated from the image pickup signal I0 using the reference coordinates (tx2, ty2) for the second image pickup signal. As shown by Formulas (35), (36), and (37) below, reference coordinates (tx3, ty3) for the third image pickup signal are calculated using the distortion coefficients kd2 and kd4, the magnification (rx, ry), and the center (xc3, yc3) of the optical axis of the third lens portion 113c. As shown by Formula (38) below, the third image pickup signal I3(x, y) is calculated from the image pickup signal I0 using the reference coordinates (tx3, ty3) for the third image pickup signal. As shown by Formulas (39), (40), and (41) below, reference coordinates (tx4, ty4) for the fourth image pickup signal are calculated using the distortion coefficients kd2 and kd4, the magnification (rx, ry), and the center (xc4, yc4) of the optical axis of the fourth lens portion 113d. As shown by Formula (42) below, the fourth image pickup signal I4(x, y) is calculated from the image pickup signal I0 using the reference coordinates (tx4, ty4) for the fourth image pickup signal. In Formulas below, ^2 denotes a square, and ^4 denotes a fourth power.

$$tx1 = x01 + xc1 + (x-xc1)*(1+kd2*r1^2+kd4*r1^4)*rx \quad (26)$$

$$ty1 = y01 + yc1 + (y-yc1)*(1+kd2*r1^2+kd4*r1^4)*ry \quad (27)$$

$$r1^2 = (x-xc1)^2 + (y-yc1)^2, r1^4 = (r1^2)^2 \quad (28)$$

$$I1(x, y) = I0(tx1, ty1) \quad (29)$$

$$I1(x, y) = (1-tx1f)*(1-ty1f)*I0(tx1i, ty1i) + tx1f*(1-ty1f)$$
$$*I0(tx1i+1, ty1i) + (1-tx1f)*ty1f*I0(tx1i, ty1i+1) +$$
$$tx1f*ty1f*I0(tx1i+1, ty1i+1) \quad (30)$$

$$tx2 = x02 + xc2 + (x-xc2)*(1+kd2*r2^2+kd4*r2^4)*rx \quad (31)$$

$$ty2 = y02 + yc2 + (y-yc2)*(1+kd2*r2^2+kd4*r2^4)*ry \quad (32)$$

$$r2^2 = (x-xc2)^2 + (y-yc2)^2, r2^4 = (r2^2)^2 \quad (33)$$

$$I2(x, y) = I0(tx2, ty2) \quad (34)$$

$$tx3 = x03 + xc3 + (x-xc3)*(1+kd2*r3^2+kd4*r3^4)*rx \quad (35)$$

$$ty3 = y03 + yc3 + (y-yc3)*(1+kd2*r3^2+kd4*r3^4)*ry \quad (36)$$

$$r3^2 = (x-xc3)^2 + (y-yc3)^2, r3^4 = (r3^2)^2 \quad (37)$$

$$I3(x, y) = I0(tx3, ty3) \quad (38)$$

$$tx4 = x04 + xc4 + (x-xc4)*(1+kd2*r4^2+kd4*r4^4)*rx \quad (39)$$

$$ty4 = y04 + yc4 + (y-yc4)*(1+kd2*r4^2+kd4*r4^4)*ry \quad (40)$$

$$r4^2 = (x-xc4)^2 + (y-yc4)^2, r4^4 = (r4^2)^2 \quad (41)$$

$$I4(x, y) = I0(tx4, ty4) \quad (42)$$

In a case where there is no distortion and the magnification is not corrected, the above transformation corresponds to an operation in which the images are cut out from the image pickup signal I0 (x, y) as shown by Formulas (43), (44), (45), and (46) below, and parallel displacement is then carried out as shown by Formulas (47), (48), (49), and (50).

$$I1(x, y) = I0(x+x01, y+y01) \quad (43)$$

$$I2(x, y) = I0(x+x02, y+y02) \quad (44)$$

$$I3(x, y) = I0(x+x03, y+y03) \quad (45)$$

$$I4(x, y) = I0(x+x04, y+y04) \quad (46)$$

$$I1(x, y) = I1(x-ddx/2, y-ddy/2) \quad (47)$$

$$I2(x, y) = I2(x+ddx/2, y-ddy/2) \quad (48)$$

$$I3(x, y) = I3(y-ddx/2, x+ddy/2) \quad (49)$$

$$I4(x, y) = I4(x+ddx/2, y+ddy/2) \quad (50)$$

Next, in Step S1200, the image pickup apparatus 101 calculates the distance. Specifically, the distance calculating portion 144 receives the first image pickup signal I1, the second image pickup signal I2, the third image pickup signal I3, the fourth image pickup signal I4, the focal length f, and the distance Dx between the optical axes in the x direction, calculates the distance, and outputs distance data DIS.

Figure 17:
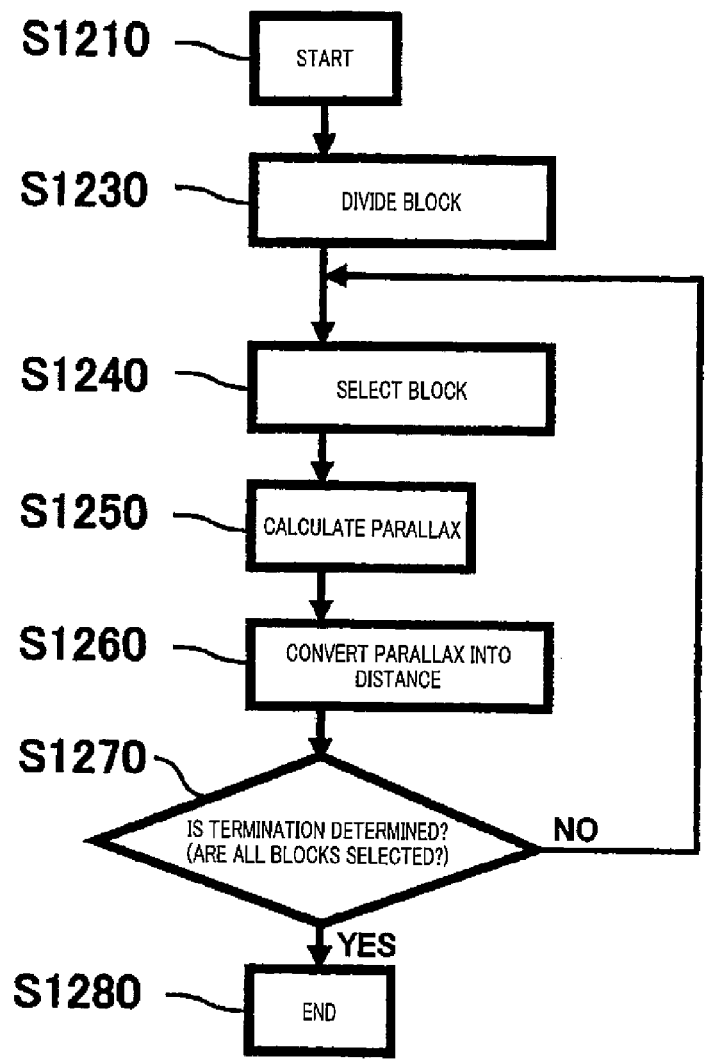
FIG. 17 is a flow chart showing an operation of a distance calculating portion of the image pickup apparatus according to Embodiment 1 of the present invention.

FIG. 17 is a flow chart showing the operation of the distance calculating portion in the image pickup apparatus according to Embodiment 1 of the present invention. The flow chart of FIG. 17 shows details of the operation of Step S1200. In the calculation of Step S1200, first, Step S1210 is executed.

In Step S1210, the distance calculating portion starts the operation of the calculation.

Next, in Step S1230, the distance calculating portion divides a block.

Figure 18:
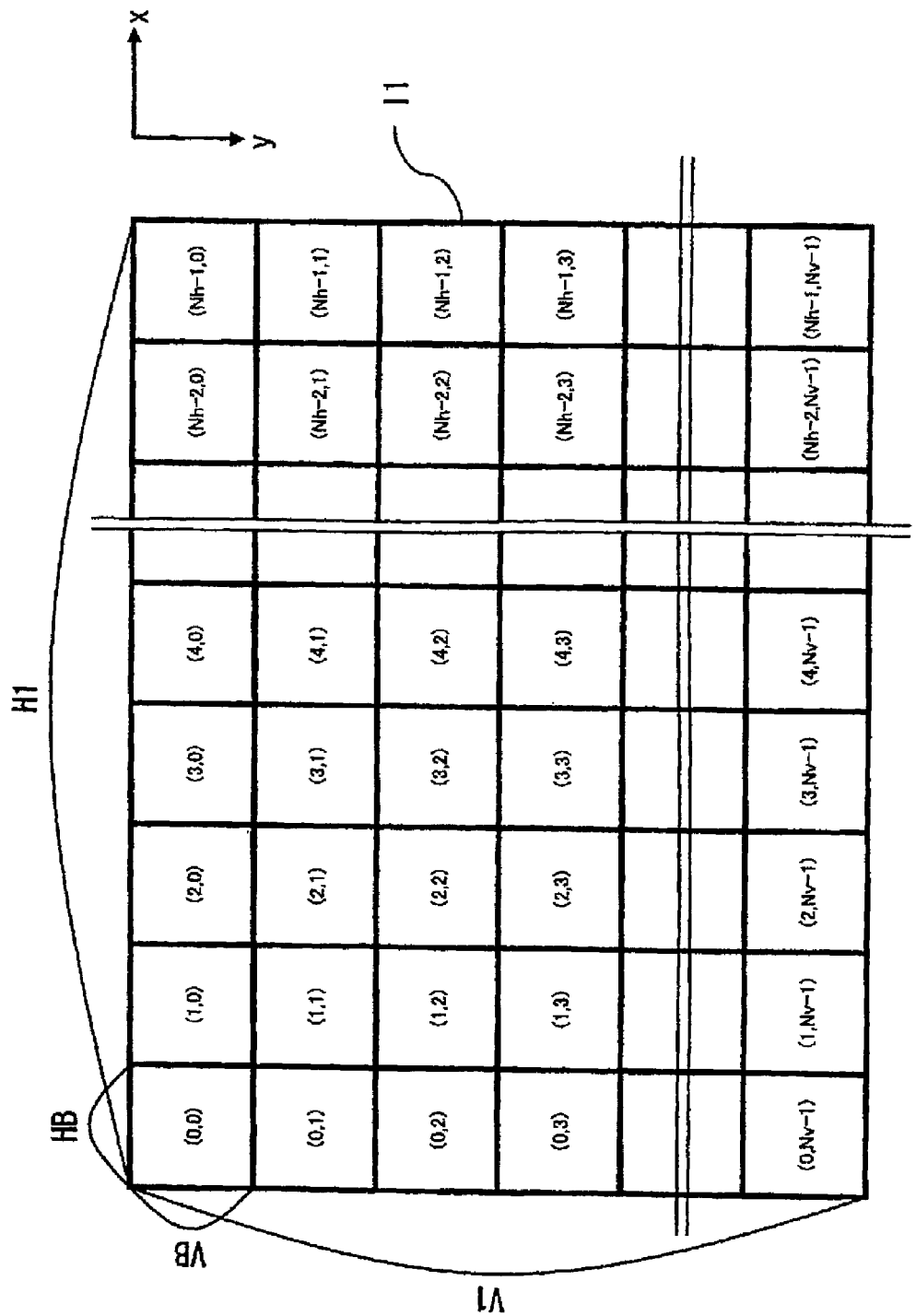
FIG. 18 is a diagram for explaining block division in the image pickup apparatus according to Embodiment 1 of the present invention.

FIG. 18 is a diagram for explaining the block division in the image pickup apparatus according to Embodiment 1 of the present invention. In FIG. 18, the first image pickup signal I1 is divided into rectangular blocks each having HB pixels in the x direction and VB pixels in the y direction, and has Nh blocks in the x direction and Nv blocks in the y direction.

Next, in Step S1240, the distance calculating portion selects a block. When executing Step S1240 for the first time after Step S1210 (FIG. 17) is executed, the block indicated by (0, 0) is selected. After that, when executing Step S1240, a block on the right side of the previous block (in the+x direction) is selected. After the block (block indicated by (Nh−1, 0), (Nh−1, 1), . . . ) on the right end in FIG. 18 is selected, the block (block indicated by (0, 1), (0, 2), . . . ) on the left end in a row under the previous block (+1 in the y direction and x=0) is selected. To be specific, in a case where a first execution of Step S1240 after the execution of Step S1210 is regarded as a 0-time execution, a block indicated by (i % Nh, int(i/Nh)) is selected at the time of an i-th-time execution of Step S1340. Here, i % Nh denotes a residue in a case where i is divided by Nh, and int(i/Nh) denotes an integer portion of a quotient when i is divided by Nh. Hereinafter, this block is referred to as a selected block B(ih, iv).

Next, in Step S1250, the distance calculating portion carries out the parallax calculation. First, the parallax between the first lens image pickup signal I1 and the second lens image pickup signal I2 and the reliability of the parallax are calculated. First, a parallax evaluated value R12(kx) regarding the first lens image pickup signal I1 and the second lens image pickup signal I2 is calculated. Here, kx denotes the displacement amount showing how much amount an image is displaced, and kx is changed to be 0, 1, 2, . . . , and SB.

Figure 19:
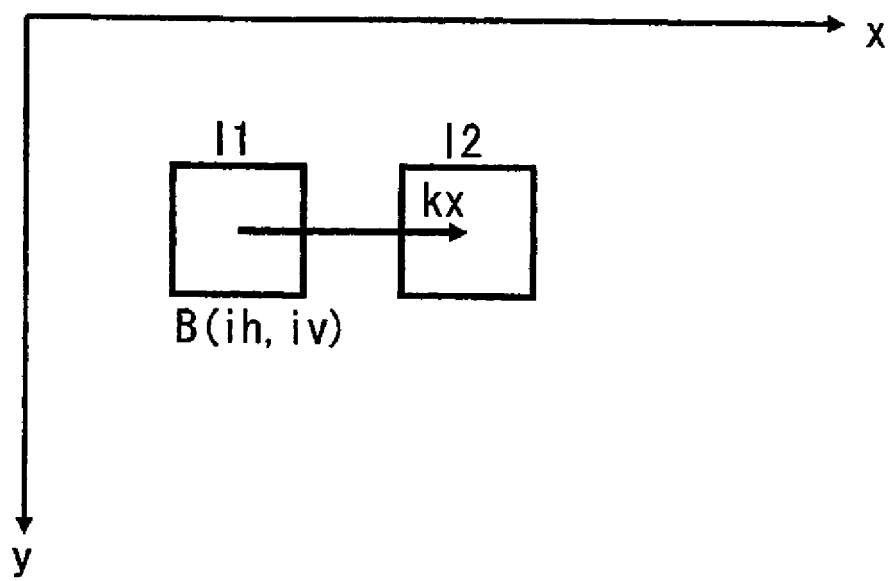
FIG. 19 is a diagram for explaining a calculation region of a parallax evaluated value in a parallax calculation utilizing a first image pickup signal and a second image pickup signal in the image pickup apparatus according to Embodiment 1 of the present invention.

FIG. 19 is a diagram for explaining a calculation region of the parallax evaluated value in the parallax calculation utilizing the first image pickup signal and the second image pickup signal in the image pickup apparatus according to Embodiment 1 of the present invention. In FIG. 19, a region indicated by I1 is a region selected by the selected block B(ih, iv) of the first lens image pickup signal I1, and a region indicated by I2 is the second lens image pickup signal I2 in a region away from the coordinates of the selected block by kx in the x direction. In cases where the displacement amount kx is from 0 to SB, the sum of absolute differences (SAD) shown by Formula (51) below is calculated, thereby obtaining the parallax evaluated value R12(kx). To be specific, the parallax evaluated value R12(kx) is calculated using the first lens image pickup signal I1 as a reference.

$$R12(kx) = \Sigma\Sigma |I1(x, y) - I2(x+kx, y)| \quad (51)$$

The parallax evaluated value R12(kx) shows how much the first lens image pickup signal I1 of the selected block B(*ih, iv*) and the second lens image pickup signal I2 in the region away from the selected block by kx in the x direction are correlated to each other. The smaller the parallax evaluated value R12(kx) is, the stronger the correlation therebetween is (that is, in a case where the parallax evaluated value R12(kx) is small, the first lens image pickup signal I1 and the second lens image pickup signal I2 are similar to each other).

Figure 20:
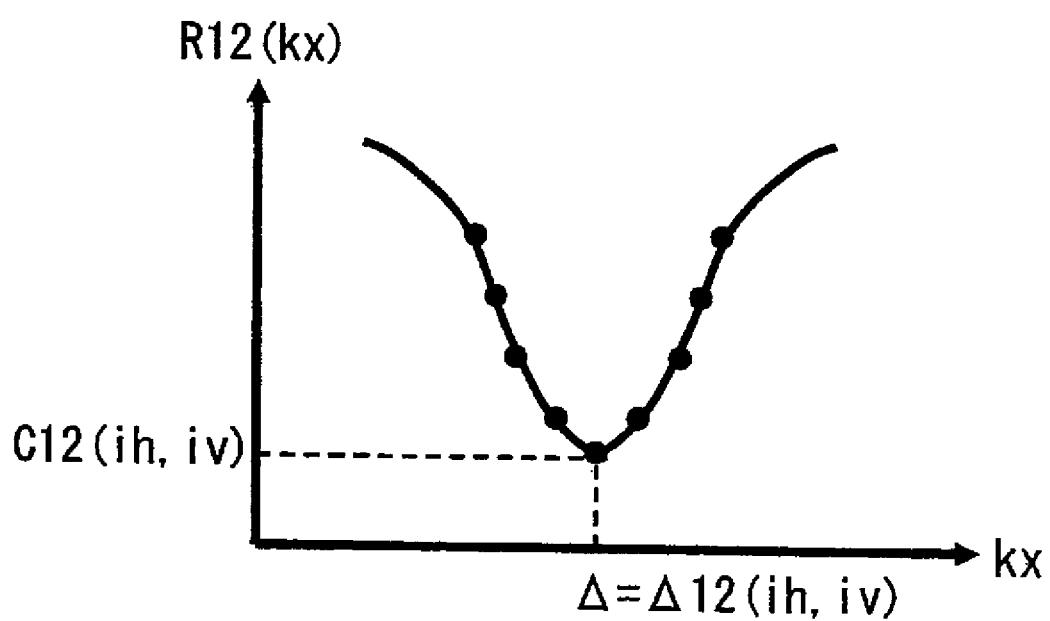
FIG. 20 is a diagram for explaining a relation between a displacement amount and the parallax evaluated value in the parallax calculation utilizing the first image pickup signal and the second image pickup signal in the image pickup apparatus according to Embodiment 1 of the present invention.

FIG. 20 is a diagram for explaining a relation between the displacement amount and the parallax evaluated value in the parallax calculation utilizing the first image pickup signal and the second image pickup signal in the image pickup apparatus according to Embodiment 1 of the present invention. As shown in FIG. 20, the parallax evaluated value R12(kx) changes depending on the value of the displacement amount kx and becomes a minimal value when the displacement amount kx is $\Delta$. This shows that the first lens image pickup signal I1 of the selected block B(*ih, iv*) and the second lens image pickup signal I2 in the region away from the selected block by $\Delta$ in the x direction are most strongly correlated to each other, that is, most similar to each other. Therefore, it is found that the parallax between the first lens image pickup signal I1 and the second lens image pickup signal I2 in the selected block B(*ih, iv*) is $\Delta$. As shown by Formula (52) below, the parallax $\Delta$ is regarded as a parallax value $\Delta$12(*ih, iv*) between the first lens image pickup signal I1 and the second lens image pickup signal I2 in the selected block B(*ih, iv*). As shown by Formula (53) below, the parallax evaluated value R12($\Delta$) is regarded as a reliability C12(*ih, iv*) of the parallax between the first lens image pickup signal I1 and the second lens image pickup signal I2 in the selected block B(*ih, iv*).

$$\Delta 12(ih, iv) = \Delta \quad (52)$$

$$C12(ih, iv) = R12(\Delta) \quad (53)$$

Next, the parallax between the first lens image pickup signal I1 and the third lens image pickup signal I3 and the reliability of the parallax are calculated in the same manner as above. Note that a displacing direction is changed to the y direction, and the displacement amount is ky. As shown by Formula (54), a parallax evaluated value R13(ky) regarding the first lens image pickup signal I1 and the third lens image pickup signal I3 in the selected block B(ih, iv) is calculated. To be specific, the parallax evaluated value R13(ky) is calculated using the first lens image pickup signal I1 as a reference. As shown by Formula (55) below, the displacement amount which gives a minimum value, i.e., the parallax $\Delta$ is regarded as a parallax value $\Delta$13(*ih, iv*) between the first lens image pickup signal I1 and the third lens image pickup signal I3 in the selected block B(ih, iv). As shown by Formula (56) below, the parallax evaluated value R13($\Delta$) is regarded as a reliability C13(*ih, iv*) of the parallax between the first lens image pickup signal I1 and the third lens image pickup signal I3 in the selected block B(ih, iv).

$$R13(ky) = \Sigma\Sigma |I1(x, y) - I1(x, y+ky)| \quad (54)$$

$$\Delta 13(ih, iv) = \Delta \quad (55)$$

$$C13(ih, iv) = R13(\Delta) \quad (56)$$

Next, the parallax between the first lens image pickup signal I1 and the fourth lens image pickup signal I4 and the reliability of the parallax are calculated in the same manner as above. Note that the displacing direction is changed to an oblique direction (direction in which the optical axis of the first lens portion 113a and the optical axis of the fourth lens portion 113d are opposite to each other), and the displacement amount is kx in the x direction and kx*Dy/Dx in the y direction. As shown by Formula (57) below, a parallax evaluated value R14(kx) regarding the first lens image pickup signal I1 and the fourth lens image pickup signal I4 in the selected block B(ih, iv) is calculated. To be specific, the parallax evaluated value R14(kx) is calculated using the first lens image pickup signal I1 as a reference. As shown by Formula (58) below, the displacement amount which gives a minimum value, i.e., the parallax $\Delta$ is regarded as a parallax value $\Delta$14(*ih, iv*) between the first lens image pickup signal I1 and the fourth lens image pickup signal I4 in the selected block B(ih, iv). As shown by Formula (59) below, the parallax evaluated value R14($\Delta$) is regarded as a reliability C14(*ih, iv*) of the parallax between the first lens image pickup signal I1 and the fourth lens image pickup signal I4 in the selected block B(ih, iv). In a case where the coordinates (x+kx, y+kx*Dy/Dx) becomes a decimal number in Formula (57), the lens image pickup signal I4 is calculated through linear interpolation or the like using peripheral pixels. As in FIG. 2, Dx and Dy respectively denote the interval between the first lens portion 113a and the fourth lens portion 113d in the x direction and the interval between the first lens portion 113a and the fourth lens portion 113d in the y direction.

$$R14(ky) = \Sigma\Sigma |I1(x, y) - I4(x+kx, y+kx*Dy/Dx)| \quad (57)$$

$$\Delta 14(ih, iv) = \Delta \quad (58)$$

$$C14(ih, iv) = R14(\Delta) \quad (59)$$

Then, the above three reliabilities of the parallaxes are compared to one another, and the most reliable parallax value is regarded as the parallax value of this block. To be specific, as shown by Formula (60) below, three reliabilities C12(*ih, iv*), C13(*ih, iv*), and C14(*ih, iv*) are compared to one another. When the reliability C12(*ih, iv*) is the smallest, $\Delta$12(*ih, iv*) is regarded as the parallax value $\Delta$(ih, iv) of the block B(ih, iv).

When the reliability C13($ih, iv$) is the smallest, $\Delta 13(ih, iv)$ is regarded as the parallax value $\Delta(ih, iv)$ of the block B($ih, iv$). When the reliability C14($ih, iv$) is the smallest, $\Delta 14(ih, iv)$ is regarded as the parallax value $\Delta(ih, iv)$ of the block B($ih, iv$). Herein, the sum of absolute differences (Formulas (53), (56), and (59)) is used as the reliability (C12, C13, and C14). However, a normalized correlation coefficient may be used. In this case, the parallax value which gives the highest reliability is selected. Here, in the case of adopting $\Delta 13(ih, iv)$, Dx/Dy that is the ratio of the intervals of the lens portions is multiplied to unify the parallax values in the x direction.

$$\begin{aligned}\Delta(ih, iv) &= \Delta 12(ih, iv) & \text{(when } C12(ih, iv) \text{ is the smallest)} \\ &= \Delta 13(ih, iv)^* Dx/Dy & \text{(when } C13(ih, iv) \text{ is the smallest)} \\ &= \Delta 14(ih, iv) & \text{(when } C14(ih, iv) \text{ is the smallest)}\end{aligned} \quad (60)$$

Next, in Step S1260, the distance calculating portion calculates the distance based on the parallax. Since Formula (8) is obtained by solving Formula (7) regarding the distance A, the distance DIS(x, y) of the region in the block B(ih, iv) is shown by Formula (61) below. Here, f denotes the focal length, Dx denotes the distance between the optical axes in the x direction, and p denotes the pitch of the light receiving elements of the image pickup element 123. Since the parallax value $\Delta$ is a pixel unit, the parallax value $\Delta$ is multiplied by p to be converted into the same unit system as the focal length f and the like.

$$DIS(x, y) = [f^*Dx]/[p^*\Delta(ih, iv)] \ ((x, y) \text{ is in a range of } B(ih, iv)) \quad (61)$$

Next, in Step S1270, the distance calculating portion determines whether to terminate the distance calculation. In a case where all the blocks are selected (in a case where the selected block is B(Nh−1, Nv−1)), the distance calculating portion determines to terminate the distance calculation, and next, Step S1280 is executed. In contrast, in a case where all the blocks are not selected (in a case where the selected block is not B(Nh−1, Nv−1)), the distance calculating portion determines to continue the distance calculation, and next, Step S1240 is executed.

In Step S1280, the distance calculating portion terminates the distance calculation, and the process returns to the upper routine. Thus, the distance DIS(x, y) at the coordinates (x, y) after cutting is calculated.

Next, in Step S1910 (FIG. 14), the image pickup apparatus 101 carries out data output. Specifically, the input-output portion 135 outputs the image data, the distance data, and the temperature data to outside the image pickup apparatus 101. The image pickup signal I0 or the first image pickup signal I1 is output as the image data. The distance DIS is output as the distance data. The temperature sensor signal Ts is output as the temperature data.

Next, in Step S1920, the image pickup apparatus 101 determines whether to terminate the operation. For example, the system control portion 131 communicates with the higher-level CPU (not shown) via the input-output portion 135 and requests a command regarding whether or not the operation is terminated. In a case where the higher-level CPU commands the termination, the operation is terminated, and next, Step S1930 is executed. In contrast, in a case where the higher-level CPU does not command the termination, the operation is continued, and next, Step S1020 is executed. To be specific, as long as the higher-level CPU does not command the termination, a loop of Steps S1020, S1030, S1110, S1120, S1200, and S1910 is continuously executed.

In Step S1930, the image pickup apparatus 101 terminates the operation.

Operational Advantages

The following effects can be obtained by configuring the image pickup apparatus of the present embodiment as above and causing the image pickup apparatus of the present embodiment to operate as above.

As above, in the image pickup apparatus of Embodiment 1, the temperature sensor 126 measures the ambient temperature of the lens array 113 and inputs the ambient temperature as the temperature sensor signal Ts. Since the lens array 113 has a substantially circular shape, it expands isotropically. By utilizing this, the amount of change ddx in the interval between the optical axes in the x direction due to the temperature increase of the lens array 113 and the amount of change ddy in the interval between the optical axes in the y direction due to the temperature increase of the lens array 113 are calculated by Formulas (12) and (13). Then, the center (xc1, yc1) of the optical axis of the first lens portion 113a, the center (xc2, yc2) of the optical axis of the second lens portion 113b, the center (xc3, yc3) of the optical axis of the third lens portion 113c, and the center (xc4, yc4) of the optical axis of the fourth lens portion 113d are generated by Formulas (14) to (21) on the basis that the optical axis changes by half the interval. Based on these, the coordinate transformation is carried out. With this, even if the lens array 113 deforms due to the temperature change, the position of the optical axis can be accurately compensated. Therefore, it is possible to obtain the parallax which is less affected by the temperature. Based on this parallax, the distance measurement can be carried out accurately. Moreover, the amount of change in the interval between the lens portions is calculated based on the temperature detected by the temperature sensor 126, each of the origin points of the optical axes of the plurality of lenses is moved by half the amount of change, and the image is corrected to cancel the distortion around the origin point of the optical axis. With this, the influences of the distortion can be reduced accurately. Therefore, the detection of the parallax and the distance measurement can be carried out with high accuracy.

In a case where the position of the optical axis of the lens portion changes due to the temperature, the image taken by the image pickup apparatus moves. For example, in a case where the image pickup apparatus is utilized to monitor a view in front of a vehicle, and even if the center of the image taken by the image pickup apparatus and the center of the image viewed by a driver are caused to coincide with each other, the center of the image is displaced due to the temperature change. Therefore, the driver feels uncomfortable. In contrast, in the case of the image pickup apparatus of Embodiment 1, even if the temperature changes, the change in the center of the image can be suppressed. Therefore, it is possible to realize the image pickup apparatus suitable for monitoring the view in front of a vehicle.

As the position is farther from the center of the optical axis, the distortion becomes significant, and the accuracy of the distance measurement deteriorates. In accordance with the image pickup apparatus of the present embodiment, an effect of avoiding utilizing a region where the distortion is significant can be obtained by compensating the optical axis as above.

For example, in the case of the x coordinate xc1 of the center of the optical axis of the first lens portion 113a, the image pickup apparatus of Embodiment 1 of the present invention stores plural sets of correction coefficients (xc1_0, xc1_256, xc1_512, xc1_768, xc1_1024, . . . , xc1_3840, and xc1_4096 that are values when the sensor temperature signal Ts is 0, 256, 512, 768, 1024, . . . , 3840, and 4096, respectively) corresponding to the temperature sensor signal Ts in the coefficient storing portion 141, and carries out interpolation regarding the temperature sensor signal Ts as shown by Formula (11) to generate the correction coefficient corresponding to the temperature sensor signal Ts. Similarly, regarding each of the y coordinates yc1 of the center of the optical axis of the first lens portion 113*a*, the center (xc2, yc2) of the optical axis of the second lens portion 113*b*, the center (xc3, yc3) of the optical axis of the third lens portion 113*c*, the center (xc4, yc4) of the optical axis of the fourth lens portion 113*d*, the distortion coefficients k2 and k4, the magnification (rx, ry), and the distance Dx between the optical axes of the lens portions in the x direction, values thereof at respective temperatures are stored in the coefficient storing portion 141, the interpolation is carried out using the temperature sensor signal Ts, and the correction coefficient corresponding to the temperature sensor signal Ts is generated.

With this, it becomes unnecessary to calculate the correction coefficient using the correction formula (to do calculations, such as Formulas (12) to (21)). Therefore, a calculating time and a calculating circuit become unnecessary. Thus, the low-cost image pickup apparatus is realized. Moreover, regarding the correction coefficient which changes complexly nonlinearly depending on the temperature, values obtained through optical analysis, experiment, and the like are stored and used. With this, an error that is a difference between the change represented by the correction formula and the actual change is prevented, and the influences of the distortion can be reduced accurately. Therefore, the detection of the parallax and the distance measurement can be carried out with high accuracy.

Moreover, when the image pickup apparatus of Embodiment 1 of the present invention prestores the correction coefficient corresponding to the temperature sensor signal Ts, it stores not the correction coefficients corresponding to all the temperature sensor signals Ts (that has digital values from 0 to 4095) but the correction coefficients corresponding to the temperature sensor signals Ts of every 256, and generates the correction coefficient interpolated with respect to the temperature. For example, in the case of the x coordinate xc1 of the center of the optical axis of the first lens portion 113*a*, the correction coefficients (xc1_0, xc1_256, xc1_512, xc1_768, xc1_1024, xc1_3840, xc1_4096 that are values when the sensor temperature signal Ts is 0, 256, 512, 768, 1024, . . . , 3840, and 4096, respectively) corresponding to the temperature sensor signals Ts of every 256 are stored, and the coefficients are used through interpolation regarding the temperature sensor signal Ts. With this, since the storage region can be reduced (the storage region to be used becomes 1/256 time), it is possible to realize the low-cost image pickup apparatus in which a circuit size is reduced.

Moreover, in the image pickup apparatus of Embodiment 1 of the present invention, based on the center (xc1, yc1) of the optical axis of the first lens portion 113*a*, the center (xc2, yc2) of the optical axis of the second lens portion 113*b*, the center (xc3, yc3) of the optical axis of the third lens portion 113*c*, the center (xc4, yc4) of the optical axis of the fourth lens portion 113*d*, the distortion coefficients k2 and k4, and the magnification (rx, ry), the image pickup signal correcting portion 143 obtains the reference coordinates (tx1, ty1) for the first image pickup signal using Formulas (26), (27), and (28), the reference coordinates (tx2, ty2) for the second image pickup signal using Formulas (31), (32), and (33), the reference coordinates (tx3, ty3) for the third image pickup signal using Formulas (35), (36), and (37), and the reference coordinates (tx4, ty4) for the fourth image pickup signal using Formulas (39), (40), and (41). Then, the image pickup signal correcting portion 143 carries out the interpolation as shown by Formulas (29), (30), (34), (38), and (42) in reference to a plurality of image pickup signals indicated by the reference coordinates to generate the first image pickup signal I1, the second image pickup signal I2, the third image pickup signal I3, and the fourth image pickup signal I4 that are corrected image pickup signals.

In the case of calculating and storing the reference coordinates in advance, the reference coordinates (the reference coordinates (tx1, ty1) for the first image pickup signal, the reference coordinates (tx2, ty2) for the second image pickup signal, the reference coordinates (tx3, ty3) for the third image pickup signal, and the reference coordinates (tx4, ty4) for the fourth image pickup signal) of all the pixels (the total number of pixels is 4*H1*V1) of the corrected image pickup signals (the first image pickup signal I1, the second image pickup signal I2, the third image pickup signal I3, and the fourth image pickup signal I4) become necessary. Therefore, a huge memory capacity is required, and this increases the cost. Especially, in a case where it is necessary to change the reference coordinates depending on the temperature, the reference coordinates corresponding to respective temperatures become necessary, and this requires a further huge memory capacity. By the configuration of the present invention, the reference coordinates (the reference coordinates (tx1, ty1) for the first image pickup signal, the reference coordinates (tx2, ty2) for the second image pickup signal, the reference coordinates (tx3, ty3) for the third image pickup signal, and the reference coordinates (tx4, ty4) for the fourth image pickup signal) are sequentially calculated from the correction coefficients (the center (xc1, yc1) of the optical axis of the first lens portion 113*a*, the center (xc2, yc2) of the optical axis of the second lens portion 113*b*, the center (xc3, yc3) of the optical axis of the third lens portion 113*c*, the center (xc4, yc4) of the optical axis of the fourth lens portion 113*d*, the distortion coefficients k2 and k4, and the magnification (rx, ry)) to generate the corrected image pickup signals (the first image pickup signal I1, the second image pickup signal I2, the third image pickup signal I3, and the fourth image pickup signal I4). With this, the storage region may be assigned to only the correction coefficients, and a large-capacity storage region is unnecessary. Therefore, the low-cost image pickup apparatus can be realized. Especially, this effect is significant in a case where the reference coordinates need to be changed based on the temperature.

Moreover, in the image pickup apparatus of Embodiment 1 of the present invention, the temperature compensation calculating portion 142 generates the magnification (rx, ry) based on the temperature sensor signal Ts, and the image pickup signal correcting portion 143 corrects the image pickup signal I0 based on the magnification (rx, ry) and the like to generate the corrected image pickup signals (the first image pickup signal I1, the second image pickup signal I2, the third image pickup signal I3, and the fourth image pickup signal I4). The length of the barrel 111 (the distance between the principal point of each of the lens portions (the first lens portion 113*a*, the second lens portion 113*b*, the third lens portion 113*c*, and the fourth lens portion 113*d*) of the lens array 113 and the light receiving surface of the image pickup element 123) changes depending on the temperature change, and this changes the magnification. Therefore, if the change in the magnification is not considered, the accuracy of the distance measurement deteriorates by the change in the length of the barrel due to the temperature. By the configuration of the present invention, the magnification ratio (rkx, rky) corresponding to the change in the length of the barrel 111 due to the temperature is generated, the magnification (rx, ry) is generated based on the magnification ratio (rkx, rky), and the image pickup signal is corrected by the magnification (rx, ry). Thus, the influences of the change in the length of the barrel due to the temperature can be reduced. With this, the highly accurate parallax calculation can be realized, and the highly accurate distance calculation can be therefore realized.

Similarly, the magnification ratio (rfx, rfy) corresponding to the change in the focal length is generated, the magnification (rx, ry) is generated based on the magnification ratio (rfx, rfy), and the image pickup signal is corrected by the magnification (rx, ry). Thus, the influences of the change in the focal length due to the temperature can be reduced. With this, the highly accurate parallax calculation can be realized, and the highly accurate distance calculation can be therefore realized.

Moreover, in the image pickup apparatus of Embodiment 1 of the present invention, the temperature compensation calculating portion 142 generates the magnification (rx, ry) based on the temperature sensor signal Ts, and the image pickup signal correcting portion 143 corrects the image pickup signal I0 based on the magnification (rx, ry) and the like to generate the corrected image pickup signals (the first image pickup signal I1, the second image pickup signal I2, the third image pickup signal I3, and the fourth image pickup signal I4). To be specific, the same magnification correction with respect to the temperature is carried out in respective image pickup signals. Since there is one barrel, the same change in the magnification due to the change in the length of the barrel occurs in all the image pickup signals. Moreover, the lens portions (the first lens portion 113a, the second lens portion 113b, the third lens portion 113c, and the fourth lens portion 113d) corresponding to respective image pickup signals (the first image pickup signal I1, the second image pickup signal I2, the third image pickup signal I3, and the fourth image pickup signal) are integrally formed in one lens array 113. Therefore, the temperature changes of the refractive indexes of all the lens portions are the same as one another. Thus, the temperature changes of the focal lengths of all the lens portions are the same as one another. As above, since the image pickup apparatus is configured using one barrel 111 and one lens array 113 including a plurality of lens portions, it can be regarded that the same change in the magnification with respect to the temperature occurs in respective lens portions. Therefore, one magnification correlation correction coefficient only needs to be generated for a plurality of image pickup regions. Therefore, the calculating time can be reduced. Thus, it is possible to realize the image pickup apparatus configured to calculate distances with high accuracy at low cost.

In the case of a subject having a shape extending in parallel with a straight line connecting the centers of the optical axes of a pair of lens portions, the shape of the subject becomes the same between the image pickup signals obtained by the pair of lens portions. Therefore, the parallax cannot be calculated. In accordance with the image pickup apparatus of Embodiment 1, three pairs of image pickup signals (the first image pickup signal I1 and the second image pickup signal I2, the first image pickup signal I1 and the third image pickup signal I3, and the first image pickup signal I1 and the fourth image pickup signal I4) are selected, and the parallaxes Δ12(ibx, iby), Δ13(ibx, iby), and Δ14(ibx, iby) of respective pairs are obtained. With this, even if the parallax cannot be obtained accurately by one pair, it can be obtained accurately by the other pairs. Therefore, the image pickup apparatus of Embodiment 1 can measure the distance based on the parallax. For example, in a case where the subject has a horizontally linear shape, the distance thereof cannot be obtained by a pair of image pickup signals (the first image pickup signal I1 and the second image pickup signal I2) lined up in the horizontal direction, but it can be obtained by a pair of image pickup signals (the first image pickup signal I1 and the third image pickup signal I3, or the second image pickup signal I2 and the fourth image pickup signal I4) lined up in the vertical direction or a pair of image pickup signals (the first image pickup signal I1 and the fourth image pickup signal I4) lined up in the diagonal direction. Therefore, the image pickup apparatus of Embodiment 1 can deal with subjects of various shapes.

Moreover, in accordance with the image pickup apparatus of Embodiment 1, a plurality of the reliabilities (C12(ih, iv), C13(ih, iv), and C14(ih, iv)) of parallaxes are respectively calculated, and for each block B(ih, iv), the parallax Δ(ih, iv) having the highest reliability is specified from the parallaxes (Δ12(ih, iv), Δ13(ih, iv), and Δ14(ih, iv)). Then, the image pickup apparatus of Embodiment 1 calculates the distance based on the parallax Δ(ih, iv) having the highest reliability. As above, since the parallax calculation is carried out based on the parallax Δ(ih, iv) having the highest reliability, a highly reliable distance measurement can be carried out. Moreover, the distance calculation is not carried out for the parallaxes (Δ12(ih, iv), Δ13(ih, iv), and Δ14(ih, iv)) of all the pairs, but it is carried out for only the parallax (Δ(ih, iv)) having the highest reliability. Therefore, the image pickup apparatus of Embodiment 1 can quickly measure the distance.

Moreover, in the image pickup apparatus of Embodiment 1 of the present invention, the temperature compensation calculating portion 142 generates the magnification (rx, ry) based on the temperature sensor signal Ts, and the image pickup signal correcting portion 143 corrects the image pickup signal I0 based on the magnification (rx, ry) and the like to generate the corrected image pickup signals (the first image pickup signal I1, the second image pickup signal I2, the third image pickup signal I3, and the fourth image pickup signal I4). Therefore, even if the temperature changes, the size of the subject image on the corrected image pickup signal does not change. On this account, in a case where the image pickup apparatus outputs not only the distance information but also the corrected image pickup signal as the image information, and a downstream controller carries out, for example, a face-recognition image processing, in which the proper size of the face can be obtained since the size of the subject image does not change even if the temperature changes.

MODIFICATION EXAMPLE

Various modification examples of the image pickup apparatus of Embodiment 1 of the present invention may be made. Hereinafter, such modification examples will be explained.

Modification Example 1

Figure 21B:
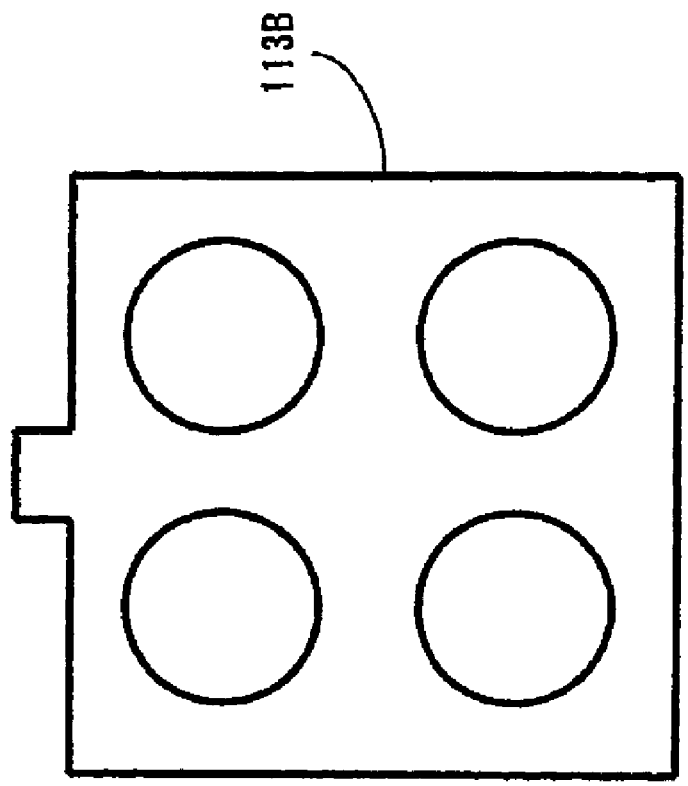
FIG. 21 are plan views showing the configuration of the lens array of the image pickup apparatus according to Modification Example 2 of Embodiment 1.
Figure 21A:
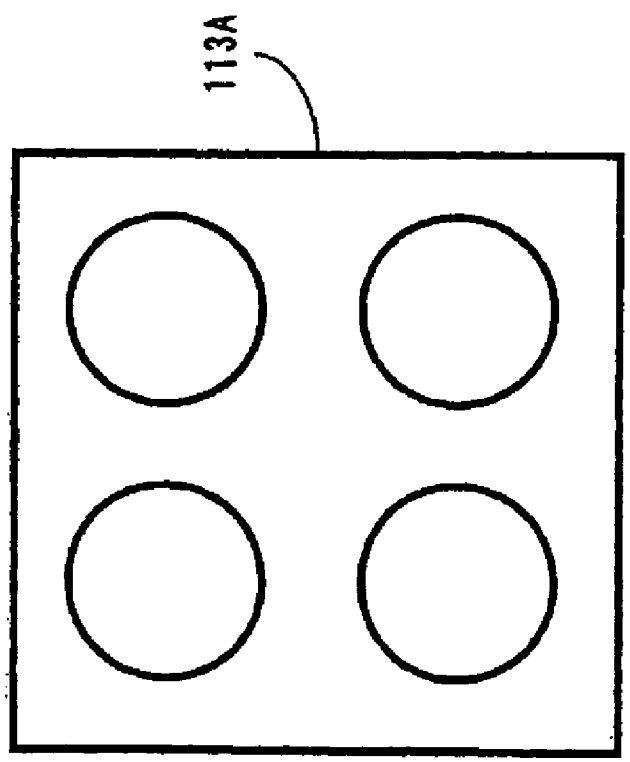

In the image pickup apparatus according to Embodiment 1, the lens array 113 is formed to have a substantially circular shape. However, the shape of the lens array 113 is not limited to this. FIG. 21 are plan views showing the configuration of the lens array of the image pickup apparatus according to Modification Example 2 of Embodiment 1. As with a lens array 113A shown in FIG. 21(a), the lens array 113 may be formed to have a rectangular shape. Further, as with a lens array 113B shown in FIG. 21(b), the lens array may be provided with, for example, a projection extending in a planar direction at, for example, an end surface of the lens array.

Even in a case where the lens array does not have a substantially circular shape, the lens portion expands substantially isotropically. Therefore, the same effects as in Embodiment 1 can be obtained by the same operations as in Embodiment 1.

Modification Example 2

Figure 22:
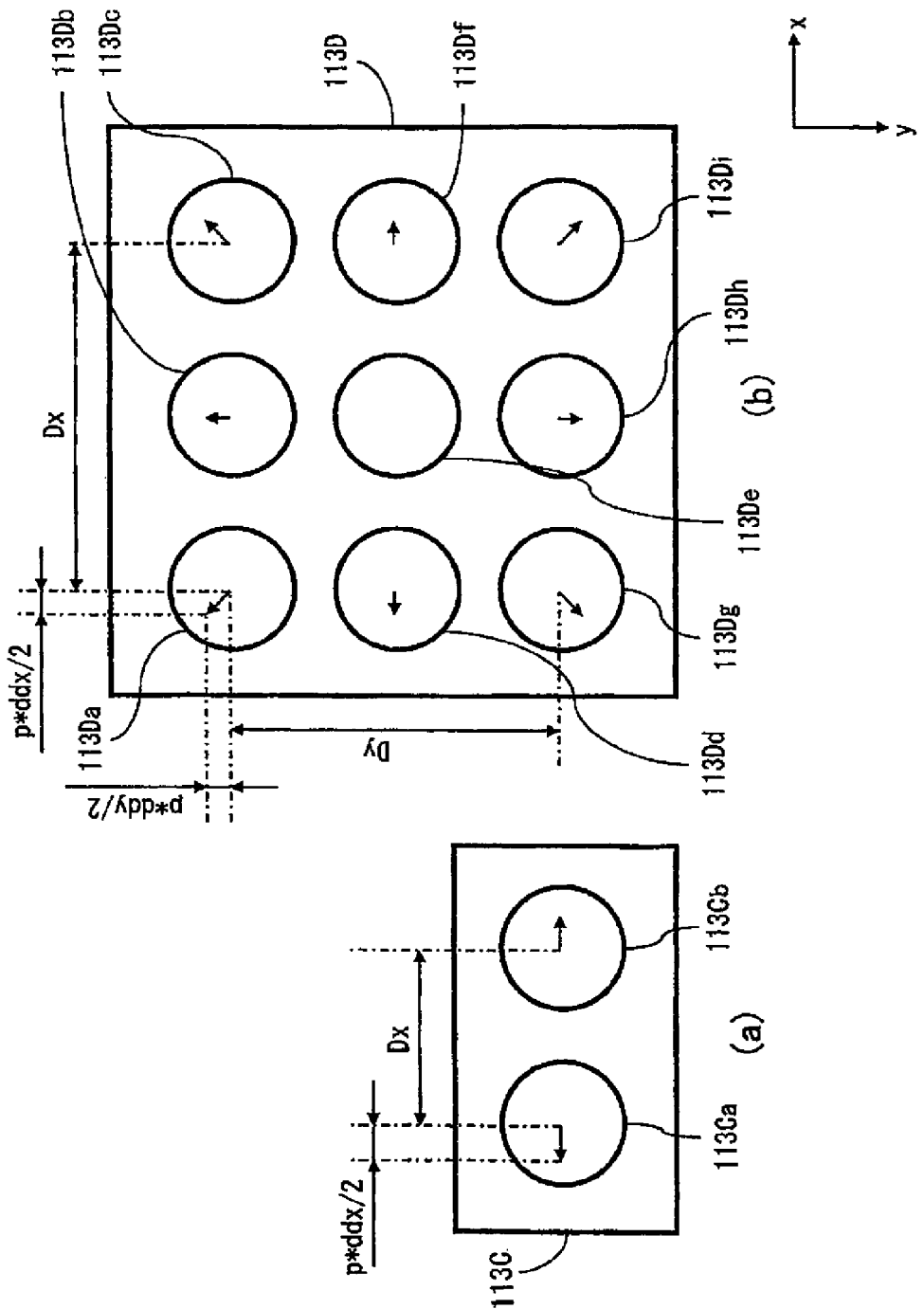
FIG. 22 are plan views showing the configuration of the lens array of the image pickup apparatus according to Modification Example 3 of Embodiment 1.

In the image pickup apparatus according to Embodiment 1, the lens array 113 includes four lens portions. However, the number of lens portions is not limited to this. FIG. 22 are plan views showing the configuration of the lens array of the image pickup apparatus according to Modification Example 3 of Embodiment 1. As with a lens array 113C shown in FIG. 22(a), two lens portions (a first lens portion 113Ca and a second lens portion 113Cb) may be arranged so as to be spaced apart from each other by Dx in the x direction. The centers of the optical axes of the lens portions are determined and stored in the coefficient storing portion 141 in the following manner. The centers of the optical axes of the lens portions are generated such that as shown by Formulas (12) and (13), the amount of change ddx in the interval between the optical axes in the x direction due to the temperature increase and the amount of change ddy in the interval between the optical axes in the y direction due to the temperature increase are calculated, and each of the centers of the optical axes is moved by half the amount of change ddx and half the amount of change ddy (p*ddx/2 in the x direction and p*ddy/2 in the y direction). Specifically, as shown by Formulas (64) and (65) below, the center (xc1, yc1) of the optical axis of the first lens portion 113Ca is generated so as to be moved by −ddx/2 in the x direction from the center (xc10, yc10) of the optical axis at the reference temperature Th0. As shown by Formulas (66) and (67) below, the center (xc2, yc2) of the optical axis of the second lens portion 113Cb is generated so as to be moved by +ddx/2 in the x direction from the center (xc20, yc20) of the optical axis at the reference temperature Th0.

$$xc1 = xc10 - ddx/2 \quad (64)$$

$$yc1 = yc10 \quad (65)$$

$$xc2 = xc20 + ddx/2 \quad (66)$$

$$yc2 = yc20 \quad (67)$$

Moreover, as with a lens array 113D shown in FIG. 22(b), nine lens portions (a first lens portion 113Da, a second lens portion 113Db, a third lens portion 113Dc, a fourth lens portion 113Dd, a fifth lens portion 113De, a sixth lens portion 113Df, a seventh lens portion 113Dg, an eighth lens portion 113Dh, and a ninth lens portion 113Di, which are arranged at regular intervals in the x direction and the y direction) may be arranged such that two of the lens portions located at an outermost peripheral portion are spaced apart from each other by Dx in the x direction and Dy in the y direction. The centers of the optical axes of the lens portions are determined and stored in the coefficient storing portion 141 in the following manner. The centers of the optical axes of the lens portions are generated such that as shown by Formulas (12) and (13), the amount of change ddx in the interval between the optical axes in the x direction due to the temperature increase and the amount of change ddy in the interval between the optical axes in the y direction due to the temperature increase are calculated, and the centers of the optical axes are moved by half the amount of change ddx and half the amount of change ddy (p*ddx/2 in the x direction and p*ddy/2 in the y direction). Specifically, as shown by Formulas (68) and (69) below, the center (xc1, yc1) of the optical axis of the first lens portion 113Da is generated so as to be moved by −ddx/2 in the x direction and −ddy/2 in the y direction from the center (xc10, yc10) of the optical axis at the reference temperature Th0. As shown by Formulas (70) and (71) below, the center (xc2, yc2) of the optical axis of the second lens portion 113Db is generated so as to be moved by −ddy/2 in the y direction from the center (xc20, yc20) of the optical axis at the reference temperature Th0. As shown by Formulas (72) and (73) below, the center (xc3, yc3) of the optical axis of the third lens portion 113Dc is generated so as to be moved by +ddx/2 in the x direction and −ddy/2 in the y direction from the center (xc30, yc30) of the optical axis at the reference temperature Th0. As shown by Formulas (74) and (75) below, the center (xc4, yc4) of the optical axis of the fourth lens portion 113Dd is generated so as to be moved by −ddx/2 in the x direction from the center (xc40, yc40) of the optical axis at the reference temperature Th0. As shown by Formulas (76) and (77) below, the center (xc5, yc5) of the optical axis of the fifth lens portion 113De is generated so as not to be moved from the center (xc10, yc10) of the optical axis at the reference temperature Th0. As shown by Formulas (78) and (79) below, the center (xc6, yc6) of the optical axis of the sixth lens portion 113Df is generated so as to be moved by +ddx/2 in the x direction from the center (xc60, yc60) of the optical axis at the reference temperature Th0. As shown by Formulas (80) and (81) below, the center (xc7, yc7) of the optical axis of the seventh lens portion 113Dg is generated so as to be moved by −ddx/2 in the x direction and +ddy/2 in the y direction from the center (xc70, yc70) of the optical axis at the reference temperature Th0. As shown by Formulas (82) and (83) below, the center (xc8, yc8) of the optical axis of the eighth lens portion 113Dh is generated so as to be moved by +ddy/2 in the y direction from the center (xc80, yc80) of the optical axis at the reference temperature Th0. As shown by Formulas (84) and (85) below, the center (xc9, yc9) of the optical axis of the ninth lens portion 113Di is generated so as to be moved by +ddx/2 in the x direction and +ddy/2 in the y direction from the center (xc90, yc90) of the optical axis at the reference temperature Th0.

$$xc1 = xc10 - ddx/2 \quad (68)$$

$$yc1 = yc10 - ddy/2 \quad (69)$$

$$xc2 = xc20 \quad (70)$$

$$yc2 = yc20 - ddy/2 \quad (71)$$

$$xc3 = xc30 + ddx/2 \quad (72)$$

$$yc3 = yc30 - ddy/2 \quad (73)$$

$$xc4 = xc40 - ddx/2 \quad (74)$$

$$yc4 = yc40 \quad (75)$$

$$xc5 = xc50 \quad (76)$$

$$yc5 = yc50 \quad (77)$$

$$xc6 = xc60 + ddx/2 \quad (78)$$

$$yc6 = yc60 \quad (79)$$

$$xc7 = xc70 - ddx/2 \quad (80)$$

$$yc7 = yc70 + ddy/2 \quad (81)$$

$$xc8 = xc80 \quad (82)$$

$$yc8 = yc80 + ddy/2 \quad (83)$$

$$xc9 = xc90 + ddx/2 \quad (84)$$

$$yc9 = yc90 + ddy/2 \quad (85)$$

Other than the above, Modification Example 2 is the same as Embodiment 1. With this, Modification Example 2 can obtain the same effects as Embodiment 1.

Other Modification Examples

In the image pickup apparatus according to Embodiment 1, the temperature sensor 126 is disposed on the substrate 121. In a case where the temperature sensor 126 is disposed on the substrate 121, the temperature sensor 126 and the temperature sensor signal input portion 134 may be connected to each other using the wire on the substrate 121. Therefore, there is an advantage that it is easy to mount the temperature sensor 126. However, the present embodiment is not limited to this. Although the temperature sensor 126 detects the temperature of the substrate 121 in the vicinity of the lens array 113, an object thereof is to detect the temperature of the lens array 113. The temperature of the lens array 113 may be detected directly or indirectly. To detect the temperature of the lens array 113 indirectly, a temperature correlated to the temperature of the lens array 113 or a physical quantity correlated to the temperature of the lens array 113 other than the temperature may be detected. Then, the obtained temperature or physical quantity is corrected as the temperature of the lens array 113, or the difference between the obtained temperature or physical quantity and the temperature of the lens array 113 is considered. With this, the obtained temperature may be used instead of the directly detected temperature of the lens array 113. From this point of view, in the present embodiment, the temperature of the substrate 121 in the vicinity of the lens array 113 is detected. Therefore, other than the above, for example, the temperature sensor 126 may be disposed inside the package 122 so as to be in parallel with the image pickup element 123. In this case, since the temperature sensor 126 is disposed in the vicinity of the image pickup element 123, it is necessary to prevent dusts and the like from adhering to the image pickup element 123 when mounting the temperature sensor 126. However, since the temperature sensor 126 is disposed closer to the lens array 113, the accuracy of the temperature detection improves. As a result, the change in the optical axis can be corrected more accurately, and the distortion can be corrected more accurately. Therefore, the accuracy of the distance measurement can be improved.

Moreover, the SLSI 125 may be manufactured by using such a manufacturing process that a part of the SLSI 125 serves as the temperature sensor 126. In this case, since it is unnecessary to mount the temperature sensor 126, cost for mounting can be reduced.

Moreover, the temperature sensor 126 may be attached to an outer wall or inner wall of the barrel 111. In this case, it is necessary to consider the wiring of the temperature sensor 126. However, since the temperature sensor 126 can be disposed on the barrel 111 in the vicinity of the lens array 113, the accuracy of the temperature detection improves. As a result, the change in the optical axis can be corrected more accurately, and the distortion can be corrected more accurately. Therefore, the accuracy of the distance measurement can be improved. Moreover, the temperature sensor 126 may be embedded in the barrel 111. In this case, it is necessary to consider the wiring of the temperature sensor 126 and a method for manufacturing the barrel 111. However, since the temperature sensor 126 can be disposed inside the barrel 111 in the vicinity of the lens array 113, the accuracy of the distance measurement can be improved as above.

Moreover, the temperature sensor 126 may be disposed on a suitable position of the lens array 113 and be connected via a suitable wire. In this case, it is necessary to consider the wiring of the temperature sensor 126. However, since the temperature sensor 126 is directly disposed on the lens array 113, the accuracy of the temperature detection further increases. As a result, the accuracy of the distance measurement can be improved. Moreover, the temperature sensor 126 may be embedded in the lens portion. In this case, it is necessary to consider the wiring of the temperature sensor 126 and a method for manufacturing the lens array 113. However, since the temperature sensor 126 is disposed inside the lens array 113, the accuracy of the temperature detection further increases. Therefore, the accuracy of the distance measurement can be improved.

Moreover, in the image pickup apparatus of Embodiment 1, the same magnification is used for all the lens portions. However, the magnification may be changed for each lens portion. In this case, respective magnifications are calculated by measurements or the like.

Moreover, the image pickup apparatus of Embodiment 1 carries out the temperature compensation of each of the distortion coefficients kd2 and kd4, the magnification (rx, ry), the center (xc1, yc1) of the optical axis of the first lens portion 113a, the center (xc2, yc2) of the optical axis of the second lens portion 113b, the center (xc3, yc3) of the optical axis of the third lens portion 113c, the center (xc4, yc4) of the optical axis of the fourth lens portion 113d, the focal length f, and the distance Dx between the optical axes of the lens portions in the x direction, and then corrects the image pickup signal. However, the present embodiment is not limited to this. For example, high-order distortion coefficients, magnifications of respective lens portions, rotations of respective lens portions, and the like may be corrected.

Embodiment 2

In the image pickup apparatus according to Embodiment 1 of the present invention, the lens array 113 is formed to have a substantially circular shape, and the lens portions (the first lens portion 113a, the second lens portion 113b, the third lens portion 113c, and the fourth lens portion 113d) are arranged such that the distance from the center of the lens array 113 to each lens portion is constant. Then, the image pickup apparatus according to Embodiment 1 corrects the image such that: the amount of change in the interval between the optical axes of the lens portions of the lens array 113 is calculated based on the temperature detected by the temperature sensor 126; and each of the origin points of the optical axes of the lens portions is moved by half the amount of change to cancel the distortion around the origin point of the optical axis. With this, the image pickup apparatus is realized, which can accurately reduce the influences of the distortion even if the temperature changes, detect highly accurate parallaxes, and therefore measure the distance with high accuracy. Moreover, the image pickup apparatus is realized, by which the center of the image does not change even if the temperature changes.

In contrast, the image pickup apparatus according to Embodiment 2 of the present invention includes the lens portions arranged such that the distance from the center of the lens array to each lens portion is not constant. Even in a case where the lens portions are arranged such that the distance from the center of the lens array to each lens portion is not constant, highly accurate parallaxes can be detected without being affected by the temperature change, and therefore, the distance measurement can be carried out with high accuracy, and the change in the center of the image can be suppressed.

The image pickup apparatus of Embodiment 2 is configured such that the lens array 113 of Embodiment 1 is replaced with a lens array 213, and the coefficient storing portion 141 of Embodiment 1 stores a correction coefficient corresponding to the lens array 213. Other than the above, the image pickup apparatus of Embodiment 2 is the same as that of Embodiment 1. Therefore, in FIGS. 2 and 23, the same reference signs are used for the same or corresponding portions, and explanations thereof are omitted. Hereinafter, Embodiment 2 may be explained in reference to the drawings of Embodiment 1.

Figure 23:
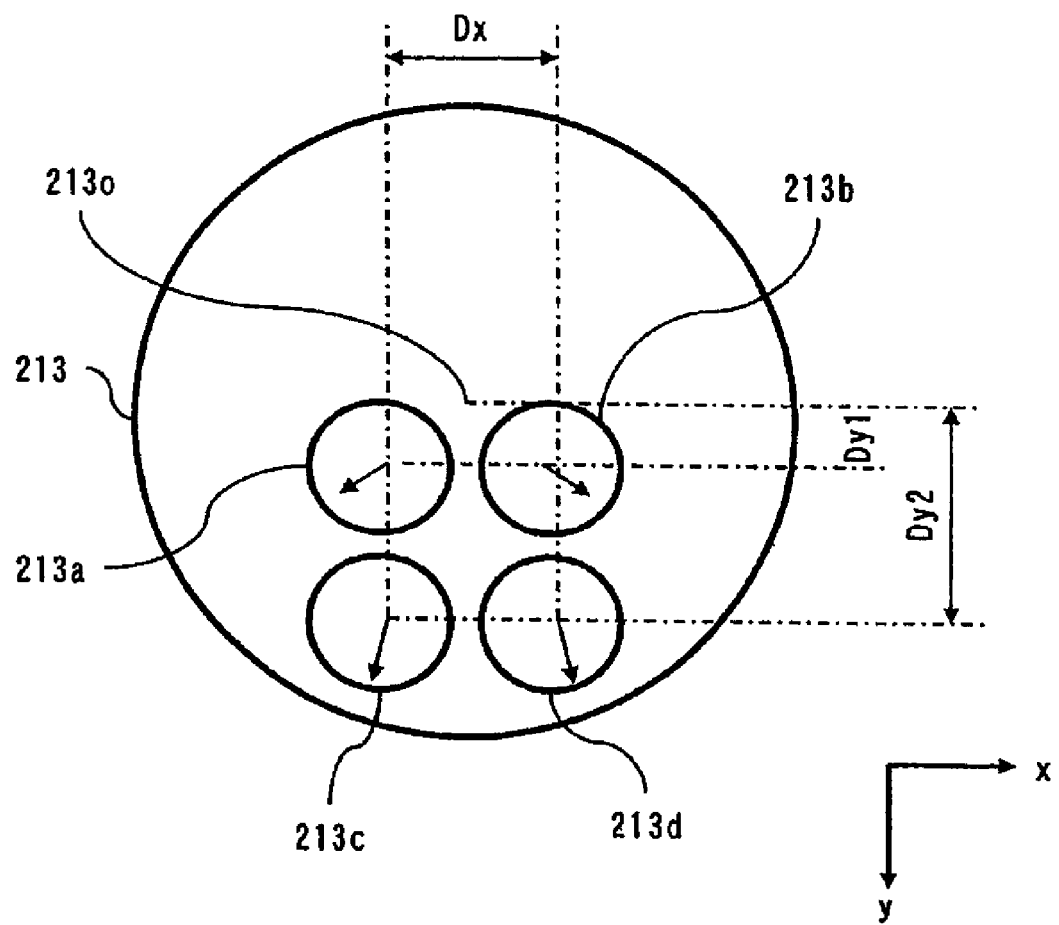
FIG. 23 is a plan view showing the configuration of the lens array of the image pickup apparatus according to Embodiment 2 of the present invention.
Figure 24:
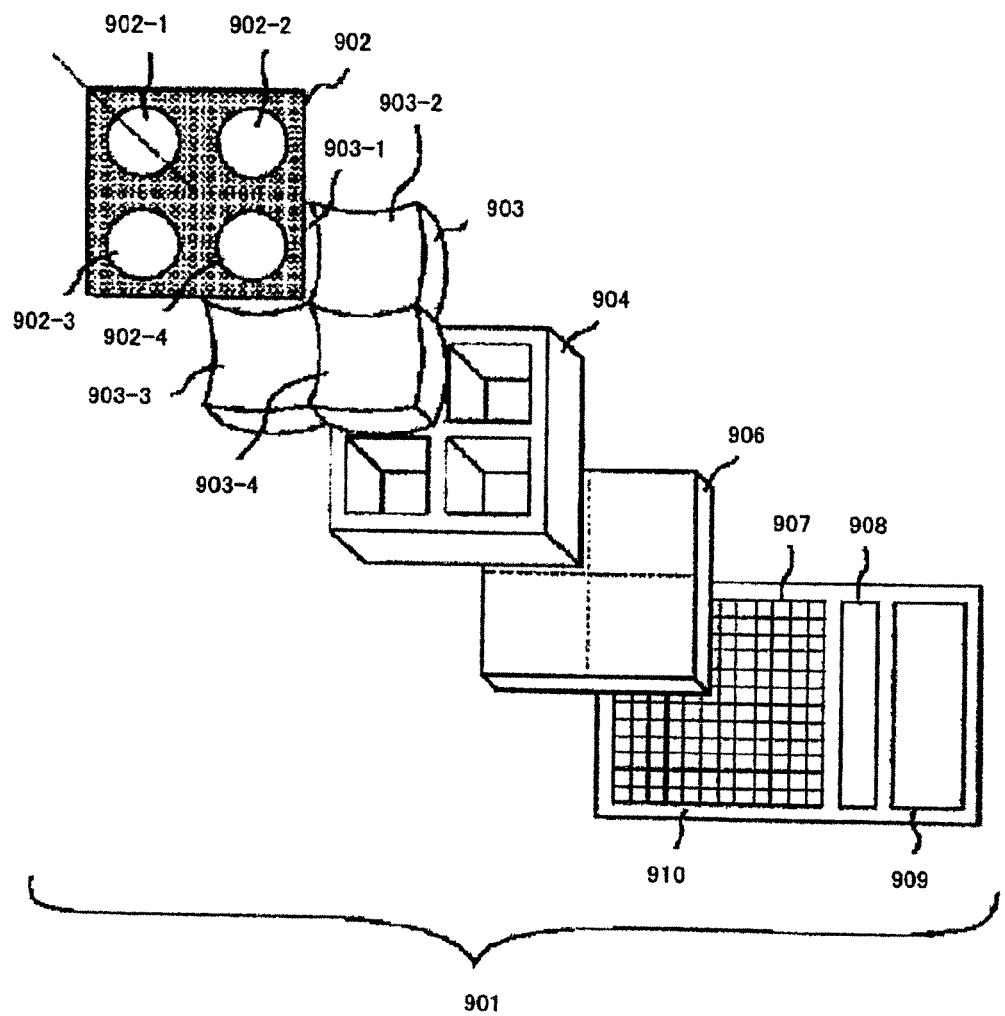
FIG. 24 is an exploded perspective view of a conventional image pickup apparatus.
Figure 25:
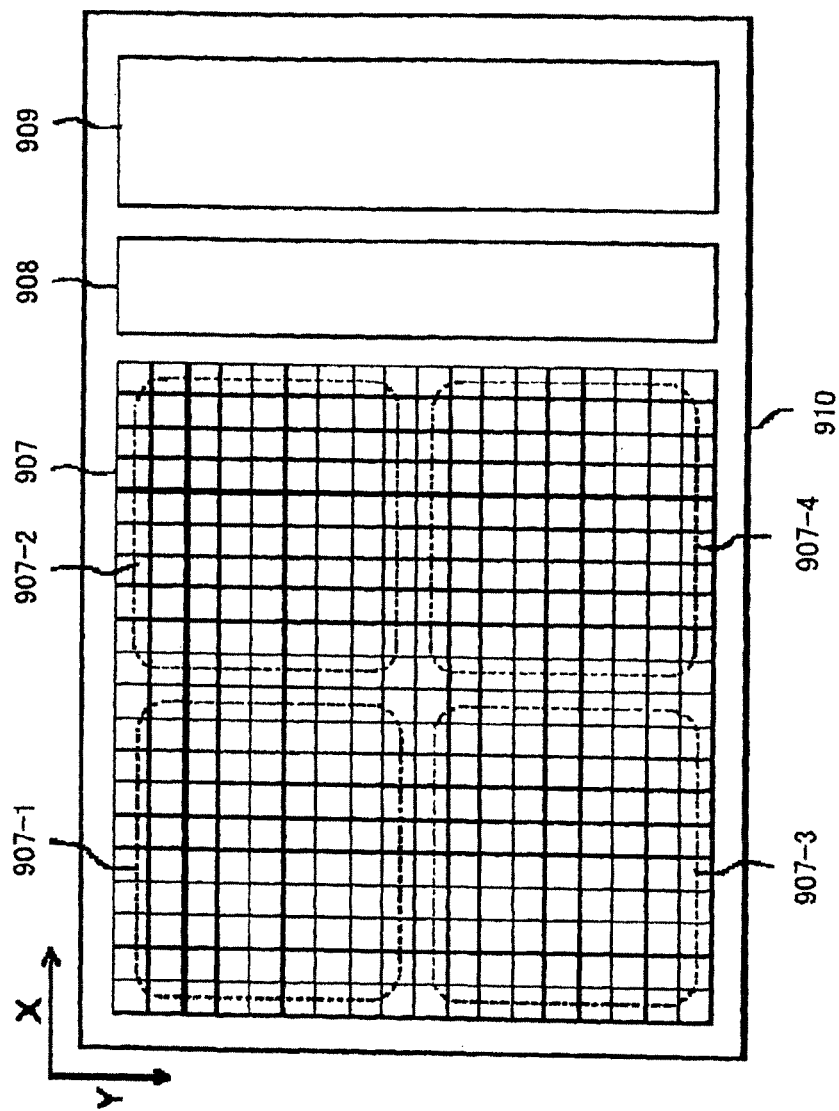
FIG. 25 is a diagram for explaining an image pickup block of the conventional image pickup apparatus.

FIG. 23 is a plan view showing the configuration of the lens array of the image pickup apparatus according to Embodiment 2 of the present invention. The lens array 213 has a substantially disc shape and is formed by an optical glass material, a transparent resin, or the like. In the lens array 213, a first lens portion 213a, a second lens portion 213b, a third lens portion 213c, and a fourth lens portion 213d are arranged in a grid pattern. As shown in FIG. 23, x-axis and y-axis are set along directions in which the first to fourth lens portions 213a to 213d are arranged. In the first lens portion 213a, the second lens portion 213b, the third lens portion 213c, and the fourth lens portion 213d, light incident from a subject side is emanated toward the image pickup element 123 side, and four images are formed on the image pickup element 123 (see FIG. 1). As shown in FIG. 23, the optical axis of the first lens portion 213a and the optical axis of the second lens portion 213b are spaced apart from each other by Dx in the horizontal direction (x-axis direction) and coincide with each other in the vertical direction (y-axis direction). Moreover, the optical axis of the first lens portion 213a and the optical axis of the second lens portion 213b are arranged to be symmetrical about an axis passing through a center 213o of the lens array 213 and extending in the y-axis direction. Each of the optical axis of the first lens portion 213a and the optical axis of the second lens portion 213b is arranged to be spaced apart from the center 213o of the lens array 213 by Dy1 in the y-axis direction. Moreover, the optical axis of the third lens portion 213c and the optical axis of the fourth lens portion 213d are spaced apart from each other by Dx in the horizontal direction (x-axis direction) and coincide with each other in the vertical direction (y-axis direction). Moreover, the optical axis of the third lens portion 213c and the optical axis of the fourth lens portion 213d are arranged to be symmetrical about the axis passing through the center 213o of the lens array 213 and extending in the y-axis direction. Each of the optical axis of the third lens portion 213c and the optical axis of the fourth lens portion 213d is arranged to be spaced apart from the center 213o of the lens array 213 by Dy2 in the y-axis direction.

The centers of the optical axes of the lens portions stored in the coefficient storing portion 141 (see FIG. 13) are determined in the following manner. When the temperature of the lens array 213 increases, the lens portions 213a to 213d expand. In this case, since the lens array 213 has a substantially circular shape, as shown by arrows in FIG. 23, the centers of the optical axes of the lens portions 213a to 213d move in a direction from the center 213o of the lens array 213 toward an outer side of the lens. The movement distance is substantially proportional to the distance from the center 213o of the lens array 213 to each of the optical axes of the lens portions 213a to 213d. To be specific, a movement distance dbx1 in the x-axis direction and a movement distance dby1 in the y-axis direction of the first lens portion 213a due to the expansion of the lens array 213 by the temperature increase can be shown by Formulas (86) and (87) below using the pixel pitch of the image pickup element 123 as a unit.

Here, Dx/2 denotes a distance between an axis passing through the center 213o of the lens array 213 at the reference temperature Th0 and extending in the x-axis direction and the optical axis of the first lens portion 213a, and Dy1 denotes a distance between an axis passing through the center 213o of the lens array 213 at the reference temperature Th0 and extending in the y-axis direction and the optical axis of the first lens portion 213a. Moreover, aL denotes a linear thermal expansion coefficient of the lens array 213, aS denotes the linear thermal expansion coefficient of the image pickup element 123, T(Ts) denotes a physical temperature of the temperature sensor when the temperature sensor signal is Ts, Th0 denotes the reference temperature, and p denotes the pixel pitch of the image pickup element 123. A movement distance dbx2 in the x-axis direction and a movement distance dby2 in the y-axis direction of the second lens portion 213b due to the expansion of the lens array by the temperature increase can be shown by Formulas (88) and (89) below using the pixel pitch of the image pickup element 123 as a unit. Here, Dx/2 denotes a distance between the axis passing through the center 213o of the lens array 213 at the reference temperature Th0 and extending in the x-axis direction and the optical axis of the second lens portion 213b, and Dy1 denotes a distance between the axis passing through the center 213o of the lens array 213 at the reference temperature Th0 and extending in the y-axis direction and the optical axis of the second lens portion 213b. A movement distance dbx3 in the x-axis direction and a movement distance dby3 in the y-axis direction of the third lens portion 213c due to the expansion of the lens array by the temperature increase can be shown by Formulas (90) and (91) below using the pixel pitch of the image pickup element 123 as a unit. Here, Dx/2 denotes a distance between the axis passing through the center 213o of the lens array at the reference temperature Th0 and extending in the x-axis direction and the optical axis of the third lens portion 213c, and Dy2 denotes a distance between the axis passing through the center 213o of the lens array at the reference temperature Th0 and extending in the y-axis direction and the optical axis of the third lens portion 213c. A movement distance dbx4 in the x-axis direction and a movement distance dby4 in the y-axis direction of the fourth lens portion 213d due to the expansion of the lens array by the temperature increase can be shown by Formulas (92) and (93) below using the pixel pitch of the image pickup element 123 as a unit. Here, Dx/2 denotes a distance between the axis passing through the center 213o of the lens array at the reference temperature Th0 and the optical axis of the fourth lens portion 213d, and Dy2 denotes a distance from the axis passing through the center 213o of the lens array at the reference temperature Th0 and extending in the y-axis direction and the optical axis of the fourth lens portion 213d.

$$ddx1=(Dx/2)*(aL-aS)*(T(Ts)-Th0)/p \tag{86}$$

$$ddy1=Dy1*(aL-aS)*(T(Ts)-Th0)/p \tag{87}$$

$$ddx2=(Dx/2)*(aL-aS)*(T(Ts)-Th0)/p \tag{88}$$

$$ddy2=Dy1*(aL-aS)*(T(Ts)-Th0)/p \tag{89}$$

$$ddx3=(Dx/2)*(aL-aS)*(T(Ts)-Th0)/p \tag{90}$$

$$ddy3=Dy2*(aL-aS)*(T(Ts)-Th0)/p \tag{91}$$

$$ddx4=(Dx/2)*(aL-aS)*(T(Ts)-Th0)/p \tag{92}$$

$$ddy4=Dy2*(aL-aS)*(T(Ts)-Th0)/p \tag{93}$$

The center of the optical axis of each lens portion is generated such that the optical axis moves by the above-described movement distance. Specifically, as shown by Formulas (94) and (95) below, the center (xc1, yc1) of the optical axis of the first lens portion 213a is generated so as to be moved by −ddx1 in the x direction and +ddy1 in the y direction from the center (xc10, yc10) of the optical axis at the reference temperature Th0. As shown by Formulas (96) and (97) below, the center (xc2, yc2) of the optical axis of the second lens portion 213b is generated so as to be moved by +ddx2 in the x direction and +ddy2 in the y direction from the center (xc20, yc20) of the optical axis at the reference temperature Th0. As shown by Formulas (98) and (99) below, the center (xc3, yc3) of the optical axis of the third lens portion 213c is generated so as to be moved by −ddx3 in the x direction and +ddy3 in the y direction from the center (xc30, yc30) of the optical axis at the reference temperature Th0. As shown by Formulas (100) and (101) below, the center (xc4, yc4) of the optical axis of the fourth lens portion 213d is generated so as to be moved by +ddx4 in the x direction and +ddy4 in the y direction from the center (xc40, yc40) of the optical axis at the reference temperature Th0.

$$xc1 = xc10 - ddx1 \tag{94}$$

$$yc1 = yc10 + ddy1 \tag{95}$$

$$xc2 = xc20 + ddx2 \tag{96}$$

$$yc2 = yc20 + ddy2 \tag{97}$$

$$xc3 = xc30 - ddx3 \tag{98}$$

$$yc3 = yc30 + ddy3 \tag{99}$$

$$xc4 = xc40 + ddx4 \tag{100}$$

$$yc4 = yc40 + ddy4 \tag{101}$$

The distortion coefficients k2 and k4, the magnification (rx, ry), the focal length f, and the distance Dx between the optical axes in the x direction may be generated and stored in the same manner as the image pickup apparatus of Embodiment 1.

In a case where there is no distortion, the coordinate transformation carried out using the above coordinate transformation tables denotes an operation in which the images are cut out from the image pickup signal I0(x, y) as shown by Formulas (102) to (105) below, and the parallel displacement is then carried out as shown by Formulas (106) to (109) below.

$$I1(x, y) = I0(x + x01, y + y01) \tag{102}$$

$$I2(x, y) = I0(x + x02, y + y02) \tag{103}$$

$$I3(x, y) = I0(x + x03, y + y03) \tag{104}$$

$$I4(x, y) = I0(x + x04, y + y04) \tag{105}$$

$$I1(x, y) = I1(x - ddx1, y + ddy1) \tag{106}$$

$$I2(x, y) = I2(x + ddx2, y + ddy2) \tag{107}$$

$$I3(x, y) = I3(y - ddx3, x + ddy3) \tag{108}$$

$$I4(x, y) = I4(x + ddx4, y + ddy4) \tag{109}$$

Embodiment 2 obtains the same effects as Embodiment 1 by configuring and operating the image pickup apparatus of the present embodiment as above.

Needless to say, Embodiment 2 can be modified in the same manner as Modification Examples of Embodiment 1.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The image pickup apparatus of the present invention is a compact image pickup apparatus capable of measuring distances. Therefore, the image pickup apparatus of the present invention is useful as a mobile phone having a camera function, a digital still camera, an in-vehicle camera, a monitoring camera, a 3-D measuring device, a stereoscopic image input camera, and the like.

REFERENCE SIGNS LIST 101 camera module
110 lens module
111 barrel
112 cover glass
113, 213 lens array
120 circuit portion
121 substrate
122 package
123 image pickup element
124 package cover glass
125 SLSI
126 temperature sensor
127 gold wire
131 system control portion
132 image pickup element driving portion
133 image pickup signal input portion
134 temperature sensor signal input portion
135 input-output portion
141 coefficient storing portion
142 temperature compensation calculating portion
143 image pickup signal correcting portion
144 distance calculating portion

The invention claimed is:
1. An image pickup apparatus comprising:
a lens array including a plurality of lenses;
a plurality of image pickup regions disposed to correspond to the plurality of lenses one-to-one and each including a light receiving surface substantially perpendicular to a direction in which an optical axis of the corresponding lens extends;
a temperature sensor disposed in a vicinity of the lens array to detect a temperature;
a correction coefficient generating portion configured to generate, based on the temperature detected by the temperature sensor, correction coefficients including correction coefficients (hereinafter referred to as "magnification correlation correction coefficients") correlated to magnifications of images taken in the image pickup regions; and
a correction calculating portion configured to correct, based on the correction coefficients, image pickup signals generated in the image pickup regions and calculate a parallax using the corrected image pickup signals,
wherein:
the correction coefficient generating portion is configured to generate, based on the temperature detected by the temperature sensor, as the magnification correlation correction coefficient, a magnification for correcting extension or shrinkage of a barrel configured to store the lens array and the plurality of image pickup regions, the correction calculating portion is configured to correct, based on the magnification, the image pickup signal generated in the image pickup region, and the magnification is represented by formula "$\beta(Th) = Yb/X = B \cdot (1+\alpha)/A$", where $\beta(Th)$ denotes a magnification at a temperature Th, X denotes a length of a subject, Yb denotes a length of a subject image on each of the image pickup regions, $\alpha$ denotes a ratio of an extended or shrunken length of the barrel to an original length of the barrel, A denotes a distance from a principal point of each of the lenses to a subject, and B denotes a distance from the principal point of each of the lenses to a corresponding image pickup region.

2. The image pickup apparatus according to claim 1, wherein the correction coefficient generating portion generates the magnification correlation correction coefficients corresponding to the plurality of image pickup regions such that the magnification correlation correction coefficients change at a same rate in accordance with a change in the temperature.

3. A semiconductor circuit element used in an image pickup apparatus including: a lens array having a plurality of lenses; and a plurality of image pickup regions disposed to correspond to the plurality of lenses one-to-one and each including a light receiving surface substantially perpendicular to a direction in which an optical axis of the corresponding lens extends, the semiconductor circuit element comprising:

a correction coefficient generating portion configured to generate, based on a temperature detected by a temperature sensor disposed in a vicinity of the lens array, correction coefficients including correction coefficients (hereinafter referred to as "magnification correlation correction coefficients") correlated to magnifications of images taken in the image pickup regions; and a correction calculating portion configured to correct, based on the correction coefficients, image pickup signals generated in the image pickup regions and calculate a parallax using the corrected image pickup signals, wherein:

the correction coefficient generating portion is configured to generate, based on the temperature detected by the temperature sensor, as the magnification correlation correction coefficient, a magnification for correcting extension or shrinkage of a barrel, the correction calculating portion is configured to correct, based on the magnification, the image pickup signal generated in the image pickup region, and the magnification is represented by formula "$\beta(Th) = Yb/X = B \cdot (1+\alpha)/A$", where $\beta(Th)$ denotes a magnification at a temperature Th, X denotes a length of a subject, Yb denotes a length of a subject image on each of the image pickup regions, $\alpha$ denotes a ratio of an extended or shrunken length of the barrel to an original length of the barrel, A denotes a distance from a principal point of each of the lenses to a subject, and B denotes a distance from the principal point of each of the lenses to a corresponding image pickup region.

4. The semiconductor circuit element according to claim 3, wherein the correction coefficient generating portion generates the magnification correlation correction coefficients corresponding to the plurality of image pickup regions such that the magnification correlation correction coefficients change at a same rate in accordance with a change in the temperature.

* * * * *